United States Patent
Nakanishi et al.

(10) Patent No.: US 6,592,741 B2
(45) Date of Patent: Jul. 15, 2003

(54) FUEL GAS GENERATION SYSTEM AND GENERATION METHOD THEREOF

(75) Inventors: Haruyuki Nakanishi, Susono (JP); Shinichi Matsumoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 09/893,407

(22) Filed: Jun. 29, 2001

(65) Prior Publication Data

US 2002/0025462 A1 Feb. 28, 2002

(30) Foreign Application Priority Data

Jul. 3, 2000 (JP) .................................. 2000-200798
Nov. 17, 2000 (JP) .................................. 2000-350771

(51) Int. Cl.$^7$ ................................. C25B 1/02
(52) U.S. Cl. ................... 205/343; 205/346; 205/637; 429/17; 429/19; 429/20; 429/22; 429/24; 429/26
(58) Field of Search ................ 205/343, 346, 205/637; 429/17, 19, 20, 22, 24, 26

(56) References Cited

U.S. PATENT DOCUMENTS 5,372,617 A 12/1994 Kerrebrock et al. ........... 48/61
5,702,491 A * 12/1997 Long et al. ................... 48/61

FOREIGN PATENT DOCUMENTS

| CA | 2 028 978 A | 5/1992 |
|---|---|---|
| EP | 0 917 225 A1 | 5/1999 |
| JP | A 51-096037 | 8/1976 |
| JP | A 53-096438 | 8/1978 |
| JP | A 54-127891 | 10/1979 |
| JP | A 56-114803 | 9/1981 |
| JP | A 63-222001 | 9/1988 |
| JP | A 2-43938 | 2/1990 |
| JP | A 6-260202 | 9/1994 |

* cited by examiner

Primary Examiner—Bruce F. Bell
(74) Attorney, Agent, or Firm—Oliff & Berridge, PLC

(57) ABSTRACT

A metal hydride is supplied into a reactor while being converted into fine particles. By injecting water from an injector, the metal hydride is hydrolyzed to generate hydrogen. The water supplied to the reactor is water generated by a fuel cell. This allows omission or a size reduction of a water tank for the hydrolysis, and therefore allows a size reduction of the system as a whole. It is possible to adopt a construction in which waste heat from the fuel cell is supplied to pyrolyze the metal hydride, a construction in which heat generated by the hydrolysis is used to pyrolyze another metal hydride, etc.

32 Claims, 13 Drawing Sheets

FUEL GAS GENERATION SYSTEM AND GENERATION METHOD THEREOF

INCORPORATION BY REFERENCE

The disclosures of Japanese Patent Applications Nos. 2000-350771 filed on Nov. 17, 2000 and 2000-200798 filed on July 3, each including the specification, drawings and abstract are incorporated herein by reference in their entirety.

BACKGROUND OF THE INVENTION

1. Field of the Invention

The invention relates to an art for generating a hydrogen-rich fuel gas by hydrolyzing or pyrolyzing a metal hydride.

2. Description of the Related Art

System constructions for operating fuel cells are roughly divided into a type of construction in which a hydrogen gas accumulated in a tank and so on is supplied to an anode (hydrogen electrode), and a type of construction in which hydrogen produced from a predetermined raw material through a chemical reaction is supplied. As an example of the latter type, a construction that uses a metal hydride, generally termed chemical hydride, is known.

Chemical hydrides are compounds of hydrogen and alkali metals or complex metals, and have a property of producing hydrogen when hydrolyzed or pyrolyzed. The chemical hydrides are also known as substances of very high energy density. Due to recent researches, various metal hydrides, such as $NaH$, $NaBH_4$, $NaAlH_4$, $LiAlH_4$, $LiBH_4$, $LiH$, $CaH_2$, $AlH_3$, $MgH_2$, etc., have become known as chemical hydrides.

For example, $NaBH_4$ is known to produce hydrogen and a metal-containing product $NaBO_2$ when hydrolyzed as in the following equation.

$$NaBH_4 + 2H_2O \rightarrow NaBO_2 + 4H_2$$

An example of the hydrogen generating apparatus that uses a metal hydride is an apparatus described in Japanese Patent Application Laid-Open No. SHO 54-127891. This apparatus hydrolyzes a metal hydride to generate hydrogen by supplying water to a vessel containing the metal hydride via a water supply pipe provided in the vessel.

A system in which a metal hydride is hydrolyzed needs a water tank for separately storing water to be supplied, and therefore is large in size. A system in which a metal hydride is pyrolyzed consumes energy for heating, and therefore has low energy efficiency.

Therefore, in order to improve the practicability of a fuel gas generation system that uses a metal hydride, the following improvements are demanded. Firstly, a size reduction and an energy efficiency improvement of the system are demanded. In recent years, in particular, installation of fuel cells in vehicles or other moving bodies is being considered. For installation in a moving body, a system of reduced size and improved energy efficiency is strongly demanded. Furthermore, in some cases in the hydrolysis of a metal hydride, the reaction stops at the time of about 50% decomposition because the metal hydride becomes coated with a metal-containing product. Therefore, the second demand is to improve the reaction rate for efficient generation of hydrogen.

It has also been found that due to the presence of impurities, a hydrogen gas generated through decomposition of a metal hydride, in some cases, is not appropriate to be supplied to a fuel cell unless it is further processed.

Furthermore, a metal hydride is consumed as hydrogen is generated. Therefore, the third demand is to establish a method for easily adding a metal hydride.

SUMMARY OF THE INVENTION

Accordingly, it is one object of the invention to improve the practicability of a fuel gas generation system that uses a chemical hydride.

In accordance with the invention, a first aspect of a fuel gas generation system for generating a hydrogen-rich fuel gas for a fuel cell includes a reaction portion that generates hydrogen by at least one reaction mode of a hydrolysis and a pyrolysis of a metal hydride, and a supply mechanism that supplies the reaction portion with at least one of a water and a heat that are generated by the fuel cell, in accordance with the reaction mode in the reaction portion.

As for the metal hydride, it is possible to use various substances that hydrolyze or pyrolyze to generate hydrogen, including the aforementioned substances, such as $NaBH_4$ and $NaAlH_4$. This construction makes it possible to use water or heat generated by the fuel cell for the decomposing reaction. In a system in which a hydrolysis is conducted in the reaction portion, the reaction portion is supplied with water generated by the fuel cell. In a system in which a pyrolysis is conducted in the reaction portion, the reaction portion is supplied with heat. By using water or heat generated by the fuel cell in this manner, it becomes possible to omit a water tank for the hydrolysis or an energy source for the pyrolysis or to sufficiently reduce the size thereof. Thus, the entire system can be reduced in size.

A second aspect of the invention includes an exothermic reaction portion that generates hydrogen by an exothermic reaction in which a first metal hydride is hydrolyzed, an endothermic reaction portion that generates hydrogen by pyrolyzing a second metal hydride, and a heat supplying mechanism that supplies a heat generated by the exothermic reaction portion to the endothermic reaction portion. The second aspect and the first aspect have objects to be achieved in common. That is, the second aspect is also intended to improve the energy efficiency in generation of hydrogen, and to reduce the size of the apparatus.

According to the second aspect, hydrogen can also be generated by the endothermic reaction portion utilizing heat generated by the exothermic reaction portion, so that the entire system can be reduced in size and can be made more efficient. Since hydrogen is generated by the endothermic reaction portion as well, the amount of hydrogen that needs to be generated by the exothermic reaction portion can be reduced, and the amount of water that needs to be supplied for the hydrolysis can also be reduced. As a result, there is another advantage of allowing a reduced capacity of the water tank.

A third aspect of the invention includes a metal ion removing mechanism that removes at least a metal ion from a gas generated by hydrolyzing or pyrolyzing a metal hydride in a reaction portion. It is possible to apply the reactor to any one of the reactors in the first aspect and the second aspect, and the reactor portion in the conventional art.

In the decomposing reaction of the metal hydride, a metal-containing product is generated concurrently with hydrogen. The metal-containing product dissolves into water to form metal ions although the amount is small. Metal ions are known to adversely affect fuel cells.

A fourth aspect of the invention includes a passage through which a mixed liquid of water and a metal hydride passes, and a catalyst that is supported in the passage and that accelerates the hydrolysis of the metal hydride. It is possible to apply the reactor to any one of the reactors in the first aspect and the second aspect, and the reactor portion in the conventional art.

Regardless of whether any one of the first to fourth aspect is adopted, it is necessary to appropriately add a metal hydride as a material in a fuel gas generation system for generating hydrogen by hydrolyzing the metal hydride. This addition of the metal hydride can easily be accomplished by using a material cassette as described below. A material cassette in accordance with the invention includes a connecting opening portion, a first storage portion, a second storage portion, a piping structure, and a housing case that houses therein at least the first storage portion, the second storage portion, and the piping structure. The connecting opening portion is a mechanism connected to a piping that communicates with a reactor of a fuel gas generation system. The first storage portion stores a metal hydride. The second storage portion stores water to be used in the hydrolysis.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter separately for the following items.

Figure 1:
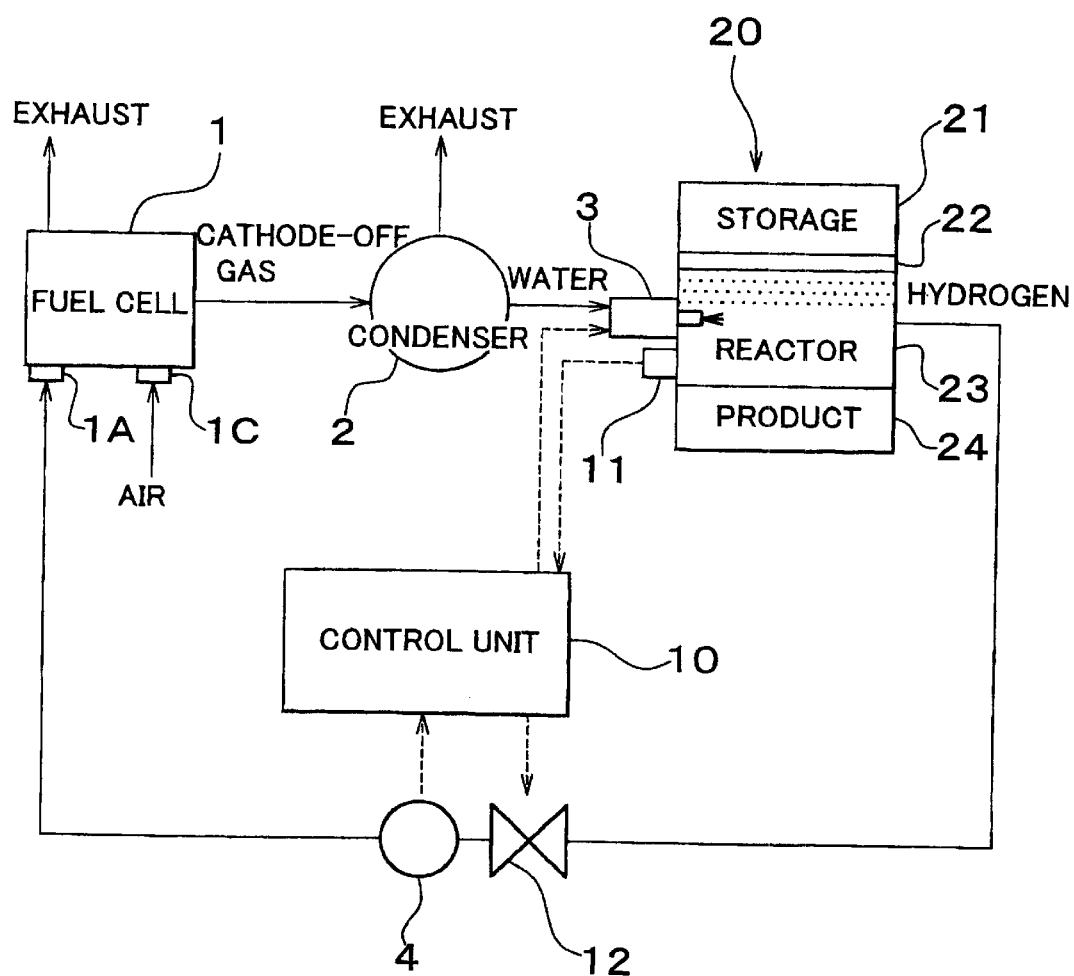
FIG. 1 is a diagram schematically illustrating a construction of a fuel gas generation system as a first embodiment of the invention.

A. Constructions of a First Embodiment that Use Generated Water
   A1. A construction of a first modification of the first embodiment in which electricity is supplied to a metal hydride.
   A2. A construction of a second modification of the first embodiment having a reducing mechanism.
   A3. A construction of a third modification of the first embodiment having a steam generating system.
   A4. A construction of a fourth modification of the first embodiment having a hydrogen separating membrane.
B. A second embodiment
C. A third embodiment
D. A fourth embodiment
A. Constructions of a First Embodiment that Use Generated Water FIG. 1 is a schematic illustration of a construction of a fuel cell system in accordance with the first embodiment. In constructions in accordance with the first embodiment described below, water generated by a fuel cell 1 is used to generate a fuel gas by hydrolyzing a metal hydride termed chemical hydride. As shown in FIG. 1, this system includes the fuel cell 1, a fuel gas generation system 20, a control unit 10, and other peripheral devices.

The fuel cell 1 is a unit that generates electric power through electrochemical reactions of hydrogen supplied by an anode 1A and oxygen from air supplied to a cathode 1C. In this embodiment, the fuel cell 1 is a polymer electrolyte fuel cell that is small in size and relatively high in operation efficiency. The fuel cell 1 may also be of various other types, for example, a phosphoric acid type, a molten carbonate type, a solid electrolyte type, an alkaline type, etc.

The fuel gas generation system 20 includes a storage 21 for storing a bulk of a metal hydride termed chemical hydride, a fine powdering mechanism 22 that reduces the bulk of the metal hydride into the form of powder, a reactor 23, and an injector 3 for injecting water. The metal hydride employed in this embodiment is $NaBH_4$. This substance is known to produce hydrogen when hydrolyzed as in the following equation:

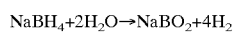

$$NaBH_4 + 2H_2O \rightarrow NaBO_2 + 4H_2$$

The metal hydride may be various other substances that produce hydrogen when hydrolyzed. As substances mentioned above, NaH, $NaBH_4$, $NaAlH_4$, $LiAlH_4$, $LiBH_4$, LiH, $CaH_2$, $AlH_3$, $MgH_2$, etc. are known.

The fine powdering mechanism 22 is a mechanism that gradually converts the form of the metal hydride into fine particles by driving a file having a metal hydride-contacting rough surface via a motor or the like. Instead of proving the fine powdering mechanism 22, it is also practicable to store a pre-powdered metal hydride. The fine powdering mechanism 22 may also be replaced by an arrangement that jets water directly to the metal hydride.

In the reactor 23, the hydrolysis represented by the aforementioned equation is caused by supplying water from the injector 3 to the metal hydride converted in fine particles. In the invention, a water supplying mechanism, such as the injector 3, may be a mechanism that sprays water in the form of liquid, or a mechanism that supplies water in the form of steam. In this embodiment, water generated by the fuel cell 1 is used as water to be supplied to the metal hydride. In the fuel cell 1, hydrogen supplied to the anode 1A turns into hydrogen ions on the anode electrode. Hydrogen ions then move through an electrolyte membrane to the side of the cathode 1C, and react with oxygen from air supplied to the cathode 1C, thereby generating water. Therefore, the cathode-off gas is a gas containing a large quantity of water thus generated. In this embodiment, thus-generated water is supplied to the reactor, and is used for the hydrolysis therein. Although the cathode-off gas may be supplied directly to the reactor 23, water is separated from the cathode-off gas by a condenser 2, and is then supplied to the reactor 23 in this embodiment. This manner of supplying water prevents components other than water from being supplied into the reactor, and thereby prevents undesired chemical reactions of such components in the reactor. Furthermore, a substantially one-to-one correspondence is ensured between the amount of water injected and the amount of water subjected to the reaction, so that the amount of water injected can be relatively easily controlled in accordance with the amount of hydrogen produced.

The reactor 23 may be provided with a catalyst that accelerates the hydrolysis. The catalyst may be, for example, a platinum-based catalyst, a ruthenium-based catalyst, or a titania-based catalysts. The catalyst may be provided by, for example, a method in which a support, such as a honeycomb monolith or the like, is provided in the reactor 23, and the support is loaded with the catalyst. It is also practicable to adopt a construction in which a mixture of the metal hydride and the catalyst is stored in the storage 21 and the mixture thereof is supplied to the reactor 23.

A product 24 produced by the hydrolysis, that is, $NaBO_2$, is accumulated on a bottom of the reactor 23. Generated hydrogen is supplied via a piping to the anode 1A of the fuel cell 1. Provided partway of the piping are a gas flow sensor 4 for detecting the amount of gas flow and a valve 12 for adjusting the amount of flow. The reactor 23 is provided with a hydrogen pressure sensor 11. Based on a value detected by the hydrogen pressure sensor 11, the amount of hydrogen produced in the reactor 23 can be detected.

The operation of the fuel cell system is controlled by the control unit 10. The control unit 10 is formed as a microcomputer having a CPU and a memory therein. To control the operation, the control unit 10 accepts inputs of detection signals from the hydrogen pressure sensor 11, the gas flow sensor 4, etc. Based on these signals, the control unit 10 controls the amount of water injected from the injector 3 and the degree of opening of the valve 12 so that an amount of hydrogen needed to generate a requested power is supplied by the fuel cell 1. Although omitted in the drawings, signals for controlling the states of operation of the fuel cell 1, the condenser, and various other units (not shown) are inputted to and outputted from the control unit 10.

Figure 2:
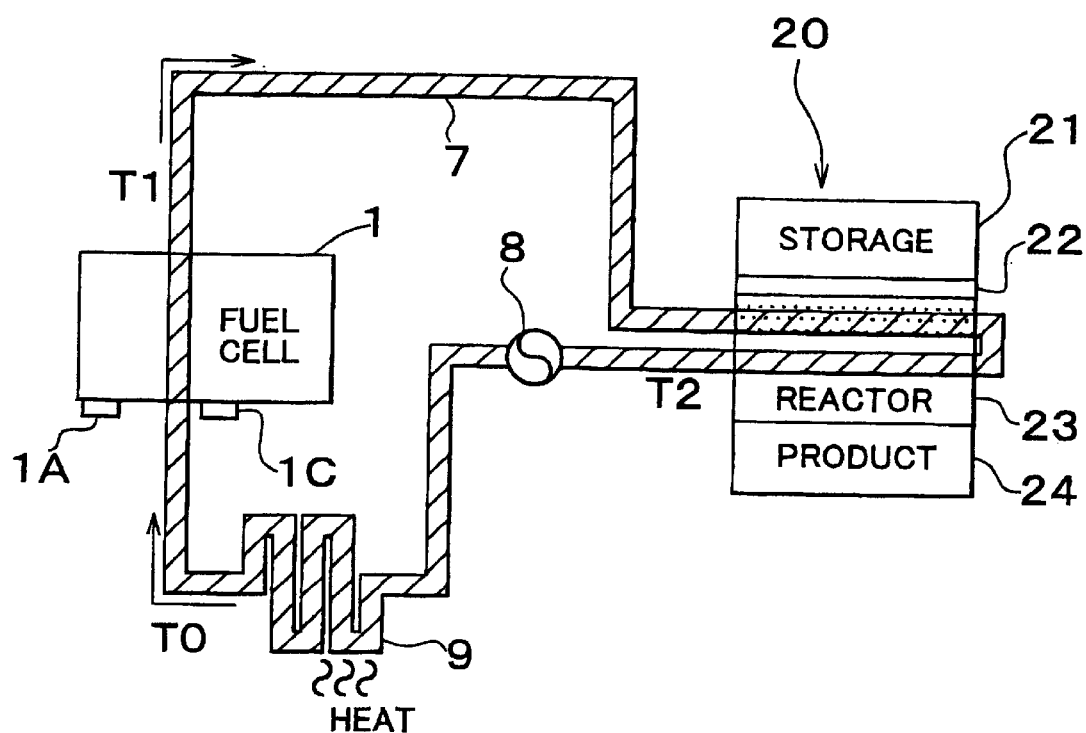
FIG. 2 is a diagram illustrating a cooling system of the fuel gas generation system.

FIG. 2 is a diagram illustrating a cooling system of the fuel cell system. Since the hydrolysis of the metal hydride is an exothermal reaction, the fuel gas generation system 20 comes to have a high temperature. The temperature during the reaction varies depending on the kind of the metal hydride, the reaction rate thereof, etc. It has been found that if $NaBH_4$ is used, the temperature during the reaction reaches the range of 200° C. to 800° C. In this embodiment, the reactor 23 is cooled by a cooling system that is also used to cool the fuel cell 1, as indicated in FIG. 2. The cooling system includes a piping 7 and a pump 8 for circulating a coolant via the fuel cell 1 and the reactor 23, and a heat dissipator 9 that releases heat from the coolant. The coolant is circulated via the fuel cell 1, the reactor 23, and the heat dissipator 9 in that order. After heat dissipation, the coolant of a low temperature T0 cools the fuel cell 1, and therefore becomes heated to a temperature T1. The operating temperature of the fuel cell 1 is about 80° C. to about 100° C. in the case of a polymer electrolyte fuel cell. Therefore, the temperature T1 roughly equals such a temperature. The coolant cools the reactor 23, and therefore becomes heated to a temperature T2. After that, the coolant dissipates heat in the dissipator 9, and is then supplied to the fuel cell 1 again.

As mentioned above, there is a great difference between the temperature of the fuel cell 1 and the temperature of the reactor 23. Therefore, the coolant, even after cooling the fuel cell 1 and therefore being heated, can be sufficiently effectively used to cool the reactor 23. As for the coolant to be circulated, selection of a liquid capable of sufficiently absorbing heat from the reactor 23 will suffice. In the embodiment, a single cooling system is used commonly for the fuel cell 1 and the reactor 23, taking advantage of the great temperature difference therebetween. Therefore, the cooling system can be reduced in size and simplified in construction. In the embodiment, the operating temperature of the fuel cell 1 is lower than that of the reactor 23. However, if the operating temperature of the fuel cell 1 is higher than that of the reactor 23, a single cooling system can be used for both the fuel cell 1 and the reactor 23 by adopting a construction in which the cooling is circuited via the reactor 23 and the fuel cell 1 in that order.

In the above-described fuel gas generation system 20 of the first embodiment, the metal hydride having an excellent energy density is used to produce hydrogen, so that the storage 21 can be reduced in size. Furthermore, since hydrogen is produced by hydrolysis, the construction of the reactor 23 can be advantageously made relatively simple. Since the fuel gas generation system 20 uses water generated by the fuel cell 1 as a water to be supplied for the hydrolysis, the supply water tank can be omitted or can be reduced in size. It is no longer necessary to frequently add water in order to operate the fuel cell 1. These advantages are effective where the fuel cell system is installed in vehicles or other types of mobile bodies. With regard to vehicles and other mobile bodies, space-related constraints for installation of a fuel cell system are severe, and the demand for reductions in the frequency of adding water or the like is high.

Before the fuel cell 1 is started, the reactor 23 cannot be sufficiently supplied with generated water. Therefore, it is preferable that the system of the first embodiment include a hydrogen storage portion for storing hydrogen for use for starting the fuel cell 1 or a startup water tank for supplying water to the reactor 23 before the startup. The hydrogen storage portion may be, for example, a hydrogen storage alloy or an air-tight vessel. It is also possible to use the reactor as a hydrogen storage portion. As for the hydrogen storage portion and the startup water tank, provision of at least one of them will suffice.

Figure 3:
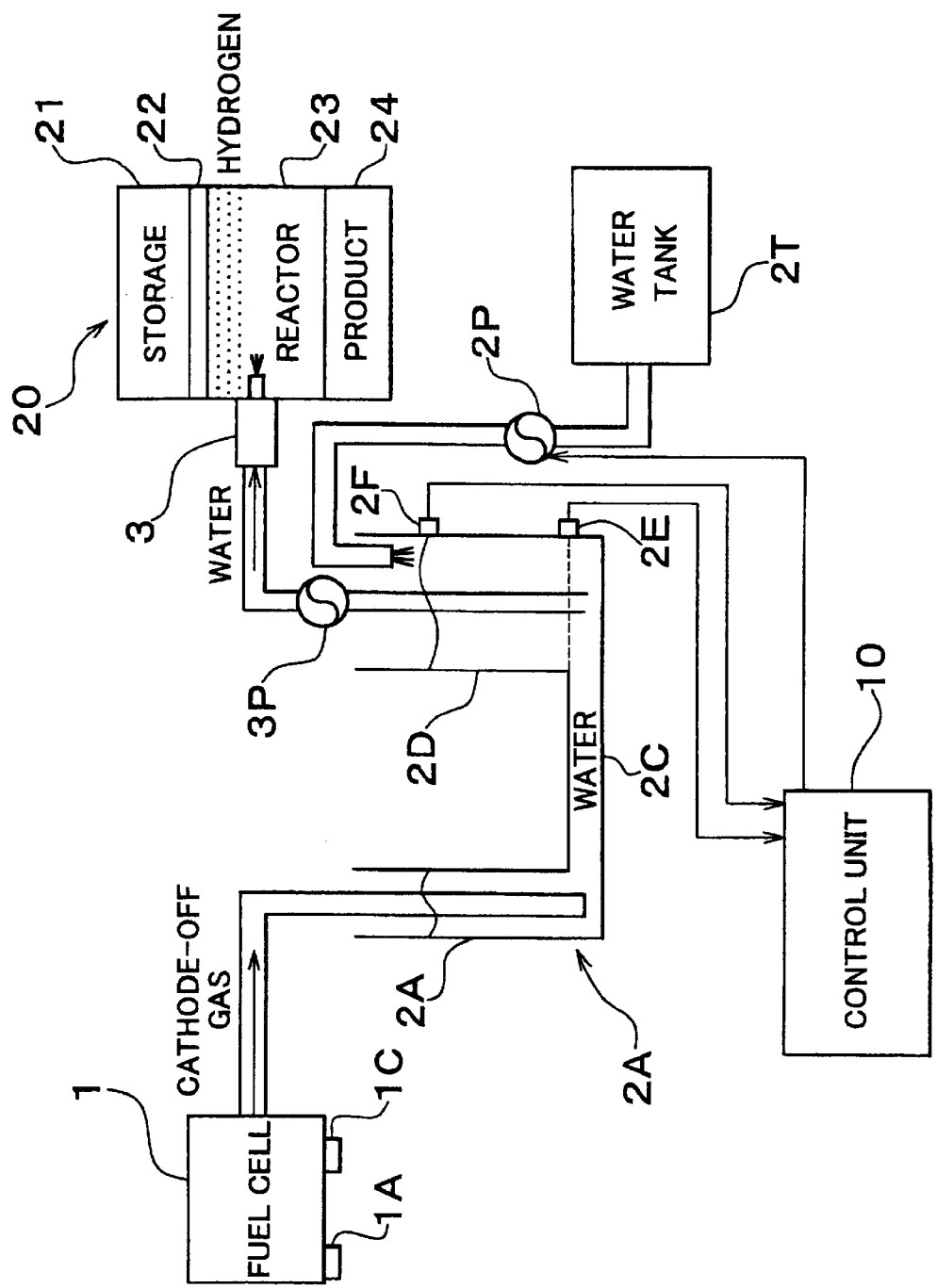
FIG. 3 is a diagram schematically illustrating a construction of a separating mechanism 2A.

In the first embodiment, water is separated from the cathode-off gas by the condenser 2. However, separation of water from the cathode-off gas can also be accomplished by various mechanisms other than the condenser, for example, a molecular sieve formed by a porous material, or the like. FIG. 3 is a diagram schematically illustrating a construction of a separating mechanism 2A as a specific example of the gas-water separating mechanism. FIG. 3 illustrates a construction corresponding to the condenser 2 in the embodiment. The separating mechanism 2A separates water from the cathode-off gas by using water. As shown in FIG. 3, the separating mechanism 2A is formed by a container for storing water. This container has a first container 2B into which the cathode-off gas is introduced, a second container 2D for storing water for the hydrolysis, and a connecting water channel 2C that connects the two containers. Oxygen and the like contained in the cathode-off gas introduced in the separating mechanism 2A form bubbles in the first container 2B and are therefore removed. As a result, only the water fraction of the cathode-off gas remains. The thus-recovered water is pumped from the second container 2D by a pump 3P, and is then used for the hydrolysis of the metal hydride. Since oxygen is removed from the cathode-off gas as described above, the oxidation of the metal hydride into a metal-containing product and water can be reduced. Therefore, the production of hydrogen by the hydrolysis of the metal hydride can be efficiently and stably performed. The first embodiment adopts a construction in which the first container 2B and the second container 2D are connected by the connecting water channel 2C, in order to avoid the mixing of air bubbles from the cathode-off gas into water when water is pumped up by the pump 3P. However, the functions of the first container 2B and the second container 2D may be realized by a single container.

The separation in the separating mechanism 2A is realized by the cathode-off gas being supplied into water. Therefore, the water level in the separating mechanism 2A needs to be kept higher than an opening portion of the cathode-off gas supply pipe. In this specific example, a control unit for maintaining a water level is provided. To maintain a water level, the control unit 10 suitably drive a pump 2P to supply water from a water tank 2T to the separating mechanism 2A. This control is performed based on outputs of water level sensors 2E, 2F provided on the separating mechanism 2A. The water level sensor 2E detects a lower limit water level in the separating mechanism 2A. The water level sensor 2F detects an upper limit water level in the separating mechanism 2A. If the water level falls below the water level sensor 2E, the control unit 10 adds water. The addition of water is stopped when the water level reaches the water level sensor 2F. In this manner, the water level in the separating mechanism 2A is maintained between the water level sensors 2E, 2F. In FIG. 3, the water level sensor 2E is disposed at a position that is higher than the position of the opening portion of the cathode-off gas supply pipe and that is equal in level to an uppermost portion of the connecting water channel 2C, taking into account the possibility of air mixing into the second container 2D via the connecting water channel 2C. However, the water level sensor 2E may be lowered from the aforementioned level to a level that is substantially equal to the level of the opening portion of the supply pipe.

Figure 4:
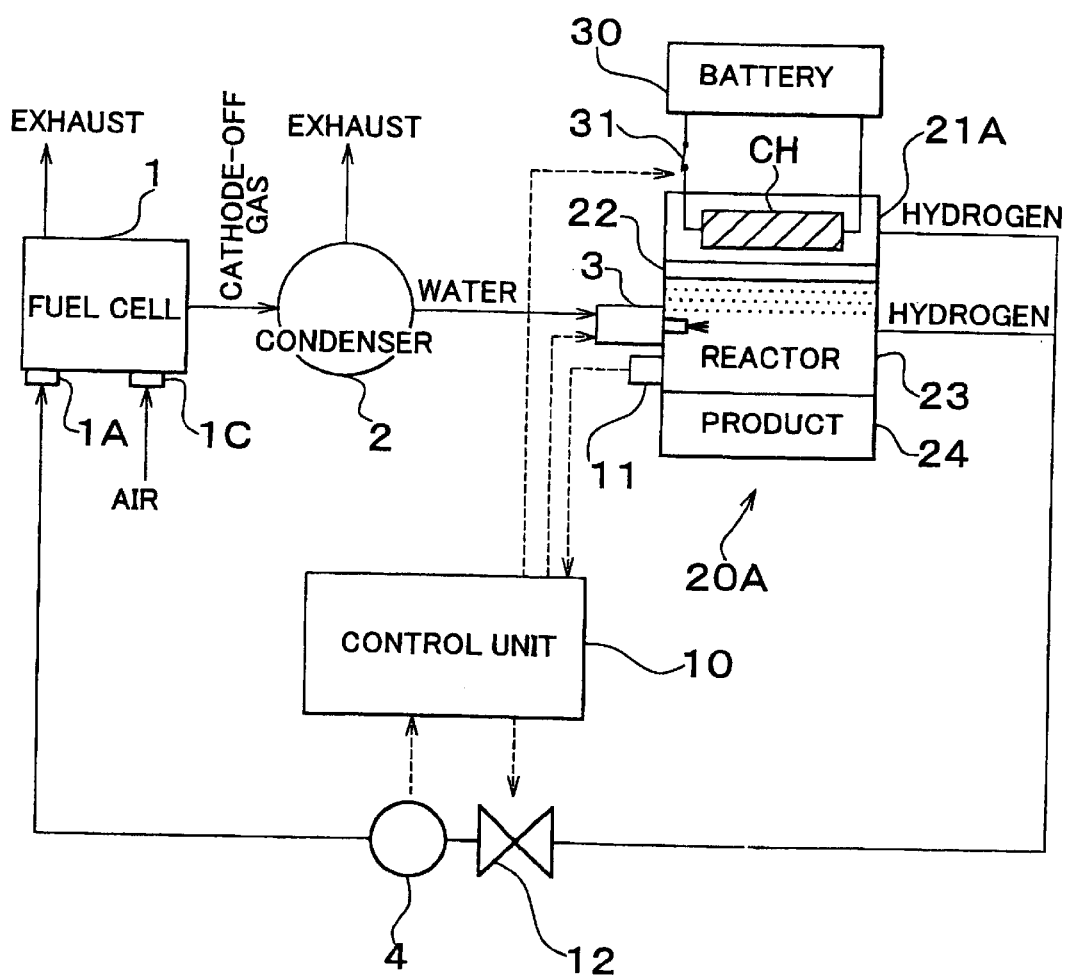
FIG. 4 is a diagram schematically illustrating a construction of a fuel gas generation system as a first modification of the first embodiment.

A1. A construction of a first modification of the first embodiment in which electricity is supplied to a metal hydride:

FIG. 4 is a diagram schematically illustrating a construction of a fuel cell system in accordance with a first modification of the first embodiment. This modification differs from the above-described first embodiment in that a storage 21A of a fuel gas generation system 20A has a circuit for supplying electric current to a metal hydride CH. Other arrangements are substantially the same as in the first embodiment.

The circuit is formed by a wiring connected to the metal hydride, a battery 30 as a power source, and a relay 31 for switching electrification on and off. The on and off states of the relay 31 are controlled by the control unit 10. When the relay 31 is tuned on, current flows through the metal hydride CH. As a result, the metal hydride becomes heated due to its internal resistance. The amount of heat generated changes in a correlation with the amount of electrification or electricity supplied. Since the entire amount of heat generated by electrification is supplied to the metal hydride CH, the metal hydride can be very efficiently heated. The metal hydride CH is pyrolyzed to produce hydrogen. Therefore, by controlling the duty of turning on and off the relay 31, the amount of electricity supplied to the metal hydride CH can be controlled, and therefore the amount of hydrogen generated by the pyrolysis can be controlled.

The electrification of the metal hydride can be effectively utilized at the time of startup of the fuel cell 1. That is, even at the time of startup of the fuel cell 1 when water generated by the fuel cell 1 cannot be supplied to the reactor 23, the metal hydride CH can be pyrolyzed to produce hydrogen by electrifying the metal hydride CH. The electrification control at the time of startup can be realized by, for example, the following process.

Figure 5:
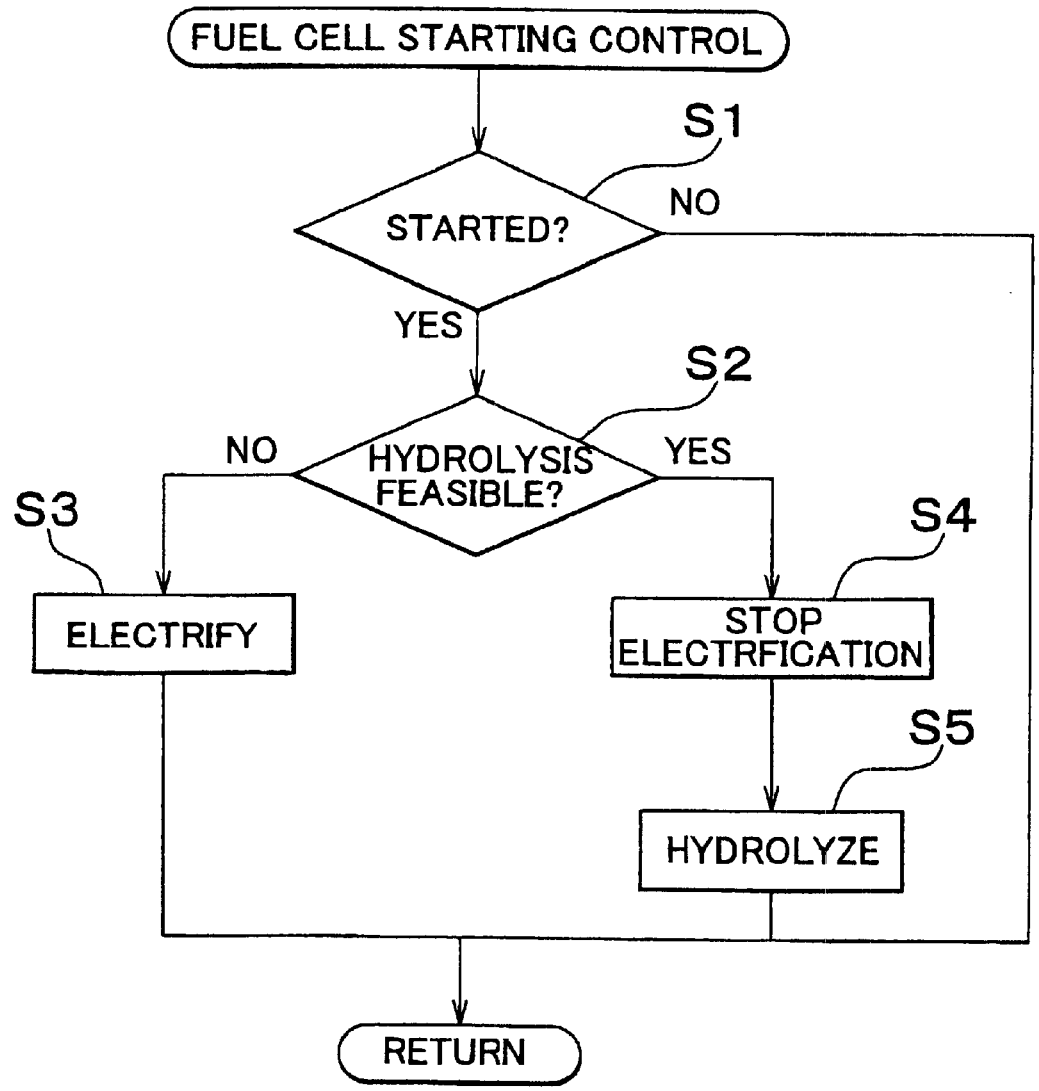
FIG. 5 is a flowchart of a fuel cell starting control.

FIG. 5 shows a flowchart of a fuel cell starting control. The fuel cell starting control is executed by the control unit 10. When this process start, the control unit 10 determines whether startup of the fuel cell 1 has been commanded (step S1). This determination may be made, for example, based on the on/off state of a start switch of the fuel cell 1 if such a switch is provided, or based on the value of requested electric power separately inputted to the control unit 10.

If startup of the fuel cell 1 has not been commanded, the control unit 10 ends the fuel cell starting process without executing any further processing. If startup of the fuel cell 1 has been commanded, the control unit 10 determines whether an amount of water that allows the hydrolysis is produced by the fuel cell 1 (step S2). If the amount of water generated is insufficient, the control unit 10 electrifies the metal hydride CH by controlling the relay 31 (step S3). The electrification is performed by turning on and off the relay 31 so as to apply a pre-set voltage. The determination as to whether the hydrolysis is feasible can be made by, for example, outputting a command for the injector 3 to inject a predetermined amount of water, and detecting the hydrogen pressure in response. This is because hydrogen pressure changes in a correlation with the amount of water supplied from the injector 3. It is also practicable to provide the fuel cell 1 or the condenser 2 with a sensor capable of detecting the amount of water generated.

If it is determined in step S2 that the hydrolysis is feasible, the control unit 10 stops the electrification by controlling the relay 31 (step S4), and starts the hydrolysis by supplying the water generated (step S5). Although the electrification may be continued regardless of the feasibility of the hydrolysis, the stopping of the electrification reduces the power consumption, and therefore can improve the energy efficiency of the entire fuel cell system.

The electrification of the metal hydride CH can also be effectively utilized during operation of the fuel cell 1, as well as the time of startup. The amount of water generated by the fuel cell 1 changes in accordance with the requested electric power, so that it is not always possible to stably supply an amount of water needed for the hydrolysis. However, the electrification of the metal hydride CH will compensate for the shortfall in the amount of water supplied, and will therefore stabilize the amount of hydrogen produced. This manner of electrification control can be accomplished by, for example, the following process.

Figure 6:
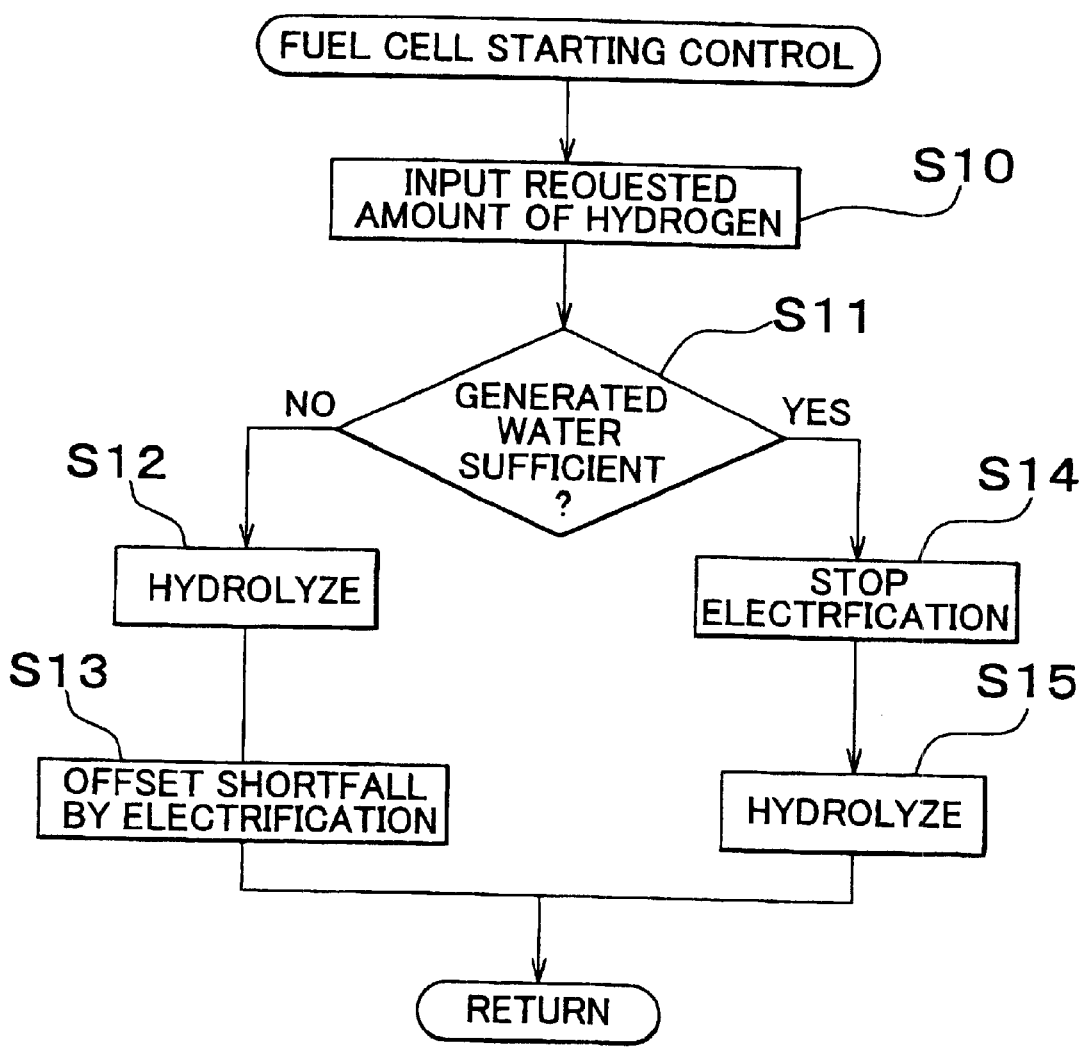
FIG. 6 is a flowchart of a fuel cell operation control.

FIG. 6 shows a flowchart of a fuel cell operation control. This control is a process executed by the control unit 10. In this process, the control unit 10 inputs a requested amount of hydrogen that is needed for electric power generation, in the form of a commanded value of requested power (step S10), and then determines whether the amount of water generated by the fuel cell 1 is sufficient (step S11). This determination can be made based on fluctuation of the hydrogen pressure in the reactor 23. If the amount of water generated is insufficient, the control unit 10 continues the hydrolysis by further supplying the generated water (step S12), and then executes a control of compensating for the shortfall in the amount of hydrogen by the electrification (step S13). The control unit 10 feedback-controls the voltage applied to the metal hydride CH by changing the duty of the relay 31 so that the hydrogen pressure becomes equal to a value corresponding to the requested amount of hydrogen.

If it is determined in step S11 that the amount of water generated is sufficient, the control unit 10 stops the electrification (step S14), and then conducts the hydrolysis by controlling the amount of water injected (step S15).

A control similar to the above-described control can be realized if the determining processing of step S10 and the processing of steps S14, S15 in the control process in FIG. 6 are omitted, and only the hydrolysis (step S12) and the compensation by electrification (step S13) are executed. It may be appropriate to provide a design in which if a sufficient amount of hydrogen is produced by the hydrolysis, that is, if the hydrogen pressure is at least a value corresponding to the requested amount of hydrogen, the amount of electrification is set to zero.

The above-described system of the first modification achieves various advantages as follows, in addition to the advantages of the first embodiment. Firstly, hydrogen can be generated by the electrification as well as by water generated by the fuel cell 1, so that the maximum amount of hydrogen that the fuel gas generation system can generate can be increased. Secondly, by controlling the electrification at the time of startup, the fuel cell 1 can be started, even though neither a hydrogen storage portion nor a water tank for startup is provided. Thirdly, by controlling the electrification during operation of the fuel cell 1, fluctuation in the generation of water can be offset, and therefore stable generation of hydrogen can be accomplished. Furthermore, with an electrification device for electrifying a metal hydride as in the first modification, the metal hydride becomes heated due to its internal resistance when electrified. Therefore, the electrification device improves the energy efficiency in the pyrolysis, in comparison with a heating device such as heater or the like. A still further advantage is that it is easy to control the amount of heat generated and therefore the amount of hydrogen produced, by controlling the voltage applied to the metal hydride.

Figure 7:
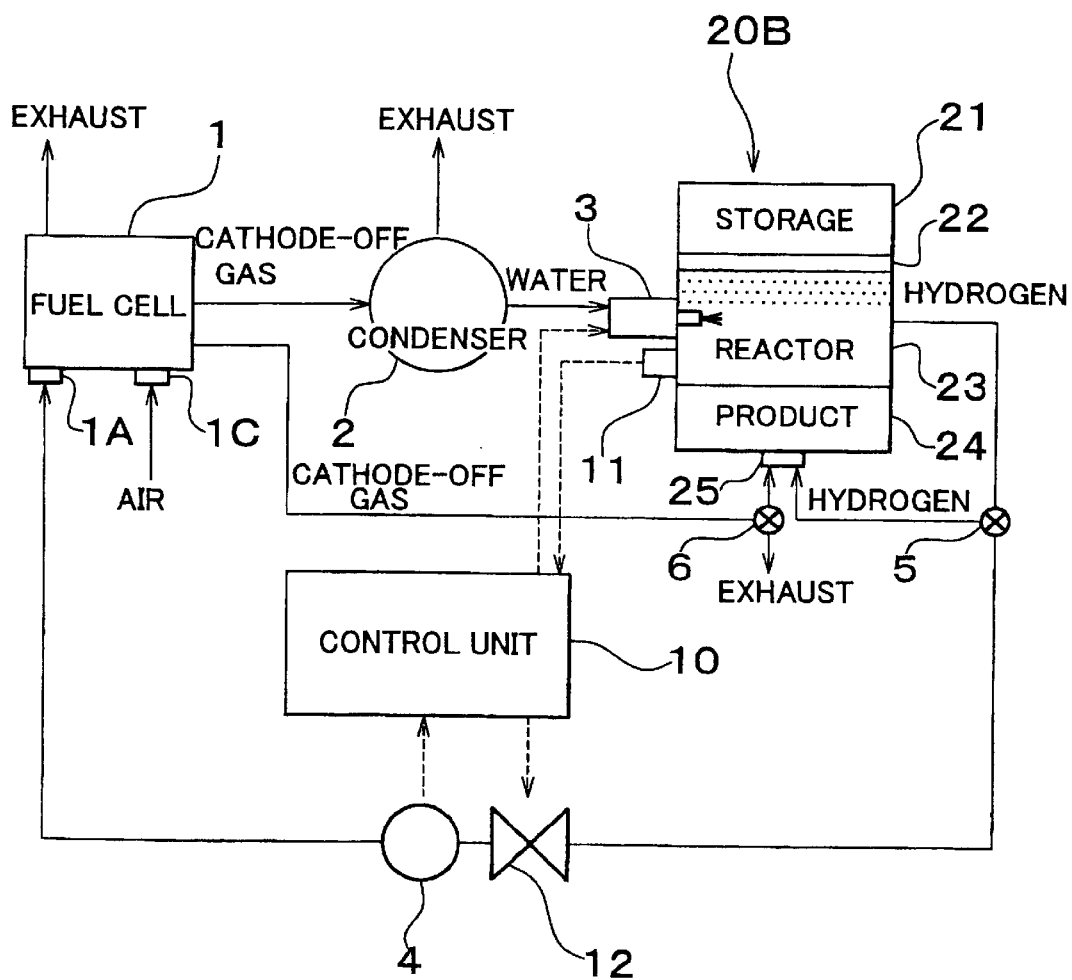
FIG. 7 is a diagram schematically illustrating a construction of a fuel gas generation system as a second modification of the first embodiment.

A2. A Construction of a Second Modification of the First Embodiment Having a Reducing Mechanism FIG. 7 is a diagram schematically illustrating a fuel cell system in accordance with a second modification of the first embodiment. A fuel gas generation system 20B of this modification differs from the system of the first embodiment as follows. A reactor 23 has a hydrogen supplying opening 25. A changeover valve 5 is provided partway of a piping for supplying hydrogen generated by the reactor 23 to an anode 1A, so that hydrogen can be supplied to the hydrogen supplying opening 25. An anode-off gas from the fuel cell 1 can be selectively directed by a changeover valve 6 to an outlet to the atmosphere or to the hydrogen supplying opening 25.

A product 24 produced by the hydrolysis of the metal hydride accumulates on a bottom of the reactor 23. If $NaBH_4$ is used as the metal hydride, the product is $NaBO_2$. This product can be reduced back to the metal hydride by supplying hydrogen thereto. In the case of $NaBO_2$ as for example, a reducing reaction represented by the following equation occurs.

$$NaBO_2 + 4H_2 \rightarrow NaBH_4 + 2H_2O$$

This reaction is an endothermic reaction of about 1300 kJ/mol. Heat needed for the reaction can be supplied by, for example, electrifying a heat that is provided on the reactor 23. If the fuel gas generation system of the second modification is installed in mobile bodies, such as vehicles or the like, various energy sources installed in the mobile bodies can be used for the system. For example, in the case of a mobile body that moves by power from an electric generator, regenerative energy obtained at the time of braking may be used for the system.

According to the fuel gas generation system 20B, by switching the changeover valves 5, 6, a surplus amount of hydrogen produced by the reactor 23 and a surplus amount of hydrogen that is not consumed by the fuel cell 1 can be supplied to the product 24. Therefore, the product 24 can be reduced back to the metal hydride, which can be reused. Hence, waste of the metal hydride can be avoided.

Although in the second modification, surplus hydrogen is supplied to the product 24, it is also practicable to supply hydrogen from an external hydrogen tank that is separately provided.

Figure 8:
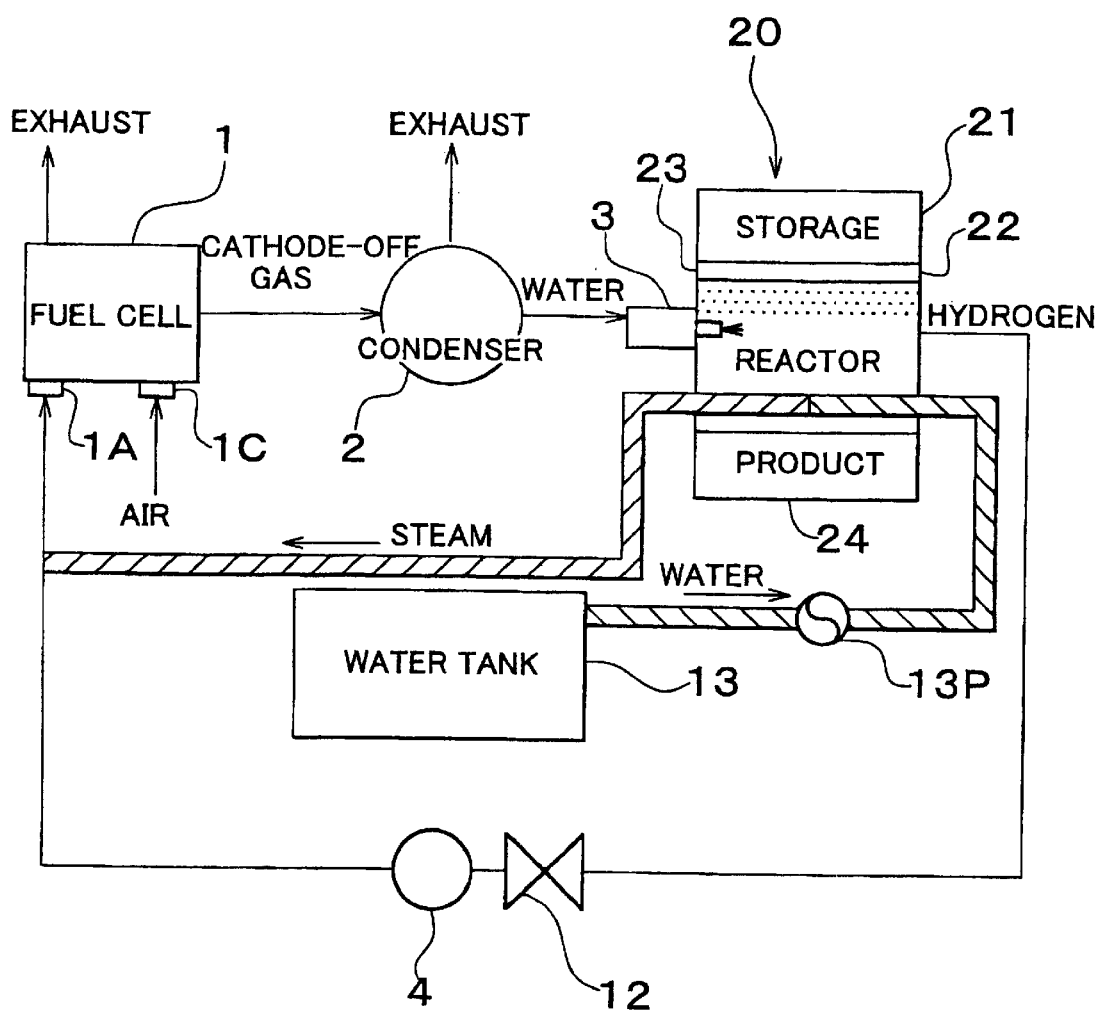
FIG. 8 is a diagram schematically illustrating a construction of a fuel gas generation system as a third modification of the first embodiment.

A3. A Construction of a Third Modification of the First Embodiment Having a Steam Generating System FIG. 8 is a diagram schematically illustrating a fuel cell system in accordance with a third modification of the first embodiment. The third modification has a steam generating system instead of or in addition to the cooling system of the first embodiment exemplified in FIG. 2. In FIG. 8, some arrangements are omitted from the illustration to avoid a complicated illustration.

Water stored in a water tank 13 is caused to flow through a piping by a pump 13P. This piping extends through a reactor 23, and joins a piping for supplying a fuel gas to an anode 1A. Water in the piping is vaporized by heat from the reactor 23 to form steam. The steam is supplied together with the fuel gas to the fuel cell 1, and serves to moisturize an electrolyte membrane.

According to the third modification, heat generated by the reactor 23 can be effectively used to generate steam. Therefore, extra energy is not needed to humidify the fuel cell 1, so that the energy efficiency of the system as a whole can be advantageously improved. A portion of the water generated by the fuel cell 1 may be used as water for the humidification.

It is also practicable to adopt a mode in which the hydrolysis is caused by using steam obtained by vaporization of water from the fuel cell 1 through the use of reaction heat from the reactor, instead of injecting water produced by the condenser 2 directly to the reactor 23. Due to the diffusibility of steam, the rate of reaction in the reactor 23 can be advantageously improved.

Figure 9:
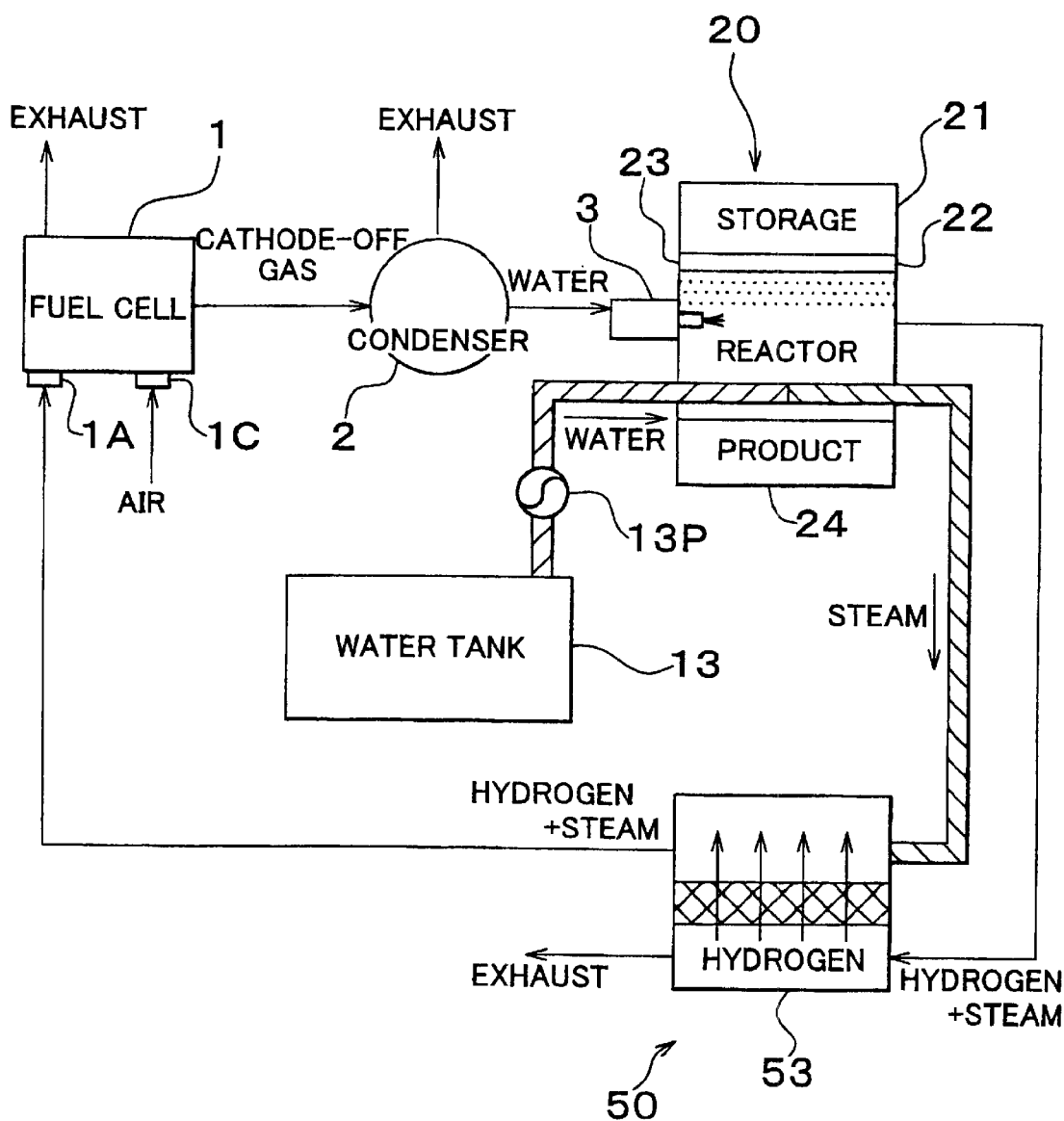
FIG. 9 is a diagram schematically illustrating a construction of a fuel gas generation system as a fourth modification of the first embodiment.

A4. A Construction of a Fourth Modification of the First Embodiment Having a Hydrogen Separating Membrane FIG. 9 is a diagram schematically illustrating a construction of a fuel cell system in accordance with a fourth modification of the first embodiment. The fourth modification has a construction based on the construction of the first embodiment in which a hydrogen separator 50 is provided downstream of a reactor 23. In FIG. 9, some arrangements, such as the control unit 10 and the like, are omitted from the illustration to avoid a complicated illustration.

The hydrogen separator 50 has a supply chamber 53 on a side of a hydrogen separating membrane 52, and an extraction chamber 51 on another side thereof. The supply chamber 53 is supplied with a gas generated in the reactor 23. This gas is a mixed gas of hydrogen and impurities. The impurities include water and a metal-containing product that are formed by the hydrolysis of a metal hydride.

The hydrogen separating membrane 52 is a thin membrane that selectively allows only hydrogen to permeate by utilizing the hydrogen partial pressure difference between the supply chamber 53 and the extraction chamber 51. The hydrogen separating membrane 52 may be, for example, a thin membrane of palladium or a palladium alloy, a thin film formed by supporting the aforementioned metal in pores of a porous body, etc.

Hydrogen in the mixed gas supplied into the supply chamber 53 is extracted to the extraction chamber 51 due to operation of the hydrogen separating membrane 52. A residual gas remaining after the separation of hydrogen is discharged from the hydrogen separator 50. The above-described construction may further include a vessel for recovering water and the metal-containing product that are contained in the discharge.

In order to improve the rate of hydrogen permeation through the hydrogen separating membrane 52, it is preferable to maintain a low hydrogen partial pressure in the extraction chamber 51. To this end, it is advisable to supply a gas other than hydrogen to the extraction side. This arrangement will also achieve an advantage of forcibly discharging hydrogen from the extraction side. In the fourth modification, steam is supplied into the extraction chamber 51. Then, separated hydrogen and steam are discharged from the extraction chamber 51, and are supplied as a fuel gas to the anode 1A. The steam is generated by vaporizing water in the water tank 13 through the use of heat from the reactor 23 as in the case of the third modification. It is also practicable to use a portion of the water generated by the fuel cell 1 in order to generate steam. Although an evaporator may be used to generate steam, the use of heat from the reactor 23 achieves a higher energy efficiency.

According to the fourth modification, hydrogen can be supplied to the fuel cell 1 after removable of impurities such as the metal-containing product and the like. A metal-containing product dissolves into water to form metal ions, thereby adversely affecting a fuel cell. Particularly, in the case of a polymer electrolyte fuel cell such as the fuel cell 1, the metal-containing product causes the ion poisoning of the electrolyte membrane, thereby reducing the proton conducting function thereof. In the fourth modification, however, the ion poisoning can be avoided by operation of the hydrogen separator 50.

In the fourth modification, hydrogen is separated by using the hydrogen separating membrane 52. In view of prevention of the ion poisoning, it is also appropriate to remove metal ions from the fuel gas by using a permeation membrane that selectively permits permeation of ions a molecular sieve that separates metal ions, etc. Furthermore, removable of metal ions may also be accomplished by chemical precipitation of metal ions. The fourth modification may be employed together with the second modification.

B. A Second Embodiment

Figure 10:
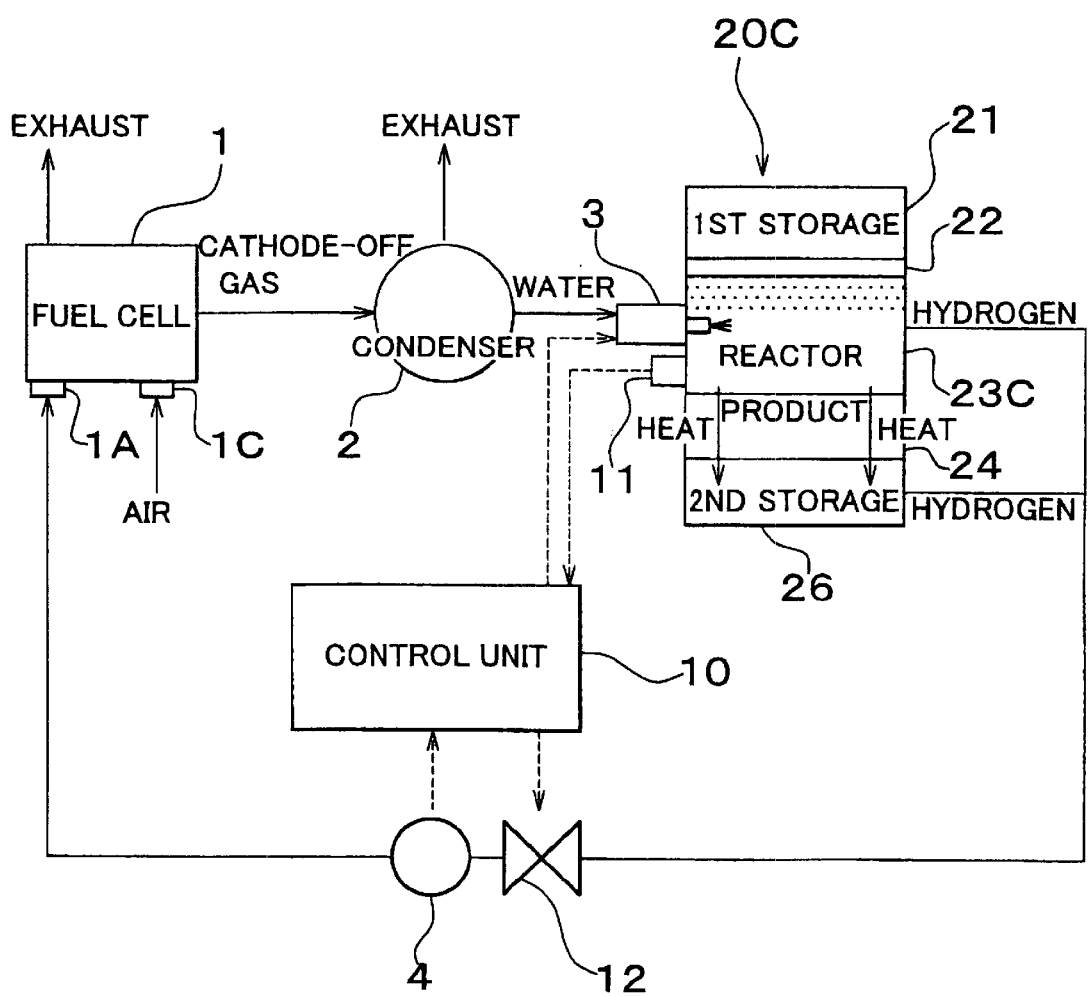
FIG. 10 is a diagram schematically illustrating a construction of a fuel gas generation system as a second embodiment of the invention.

FIG. 10 is a diagram schematically illustrating a construction of a fuel cell system in accordance with a second embodiment of the invention. A fuel gas generation system 20C of the second embodiment differs from the system of the first embodiment in that metal hydrides are provided at two site, that is, a first storage 21 and a second storage 26. Other arrangements are substantially the same as those of the first embodiment. The first storage 21 stores a metal hydride for hydrolysis. The second storage 26 stores a metal hydride for pyrolysis. The second storage 26 is a bottom section of a reactor 23C, that is, the second storage 26 is not a dedicated separate container or the like. By forming the first storage 21 and the second storage 26 within a single storage container in this manner, both size reduction and efficient heat supply can be accomplished.

Although the metal hydride stored in the first storage 21 and the metal hydride stored in the second storage 26 may be of the same kind, they are of different kinds in the second embodiment. That is, two kinds of metal hydrides suitable for hydrolysis and pyrolysis, respectively, are employed. More specifically, the first storage 21 stores $NaBH_4$, and the second storage 26 stores LiH. It is known that LiH thermally decomposes to produce hydrogen as represented by the following equation.

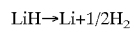

$$LiH \rightarrow Li + 1/2 H_2$$

The second storage 26 may store, instead of LiH, any other metal hydride that thermally decomposes to produce hydrogen.

When water is supplied from an injector 3 into the reactor 23C, the metal hydride supplied from the first storage 21 hydrolyzes to produce hydrogen in the reactor 23C. This reaction is an exothermic reaction. Thus-generated hydrogen is supplied to the fuel cell 1, and the product 24 is accumulated on LiH in the second storage 26. Since LiH is stored in the reactor 23C, heat generated by the hydrolysis transfers to LiH. Receiving heat, LiH in the second storage 26 thermally decomposes to produce hydrogen. The generated hydrogen is then supplied to the fuel cell 1.

According to the fuel gas generation system of the second embodiment, a large amount of hydrogen can be quickly generated owing to decomposition of the two kinds of metal hydrides. Since heat generated by the hydrolysis is used for the pyrolysis in the second storage 26, efficient hydrogen generation is realized without wasting energy. As a result, size reduction and efficiency improvement of the system as a whole can be accomplished. Furthermore, in the fuel gas generation system 20C of the second embodiment, a section of the endothermic reaction and a section of the exothermic reaction are provided within a single reactor 23C, efficient supply of heat from the section of the exothermic reaction to the section of the endothermic reaction can be accomplished while a size reduction is achieved.

It is not altogether necessary to provide the second storage 26 within the reactor 23C. That is, the second storage 26 can be located anywhere in the fuel gas generation system 20C provided heat generated by the hydrolysis can be used for the pyrolysis in. For example, it is practicable to adopt a construction in which the second storage 26 is formed as a container separate from the reactor 23C, and is disposed in contact therewith so that heat generated by the hydrolysis can be used in the second storage 26 via heat conduction through members of the two containers. It is also practicable to adopt a construction in which heat generated by in the reactor 23C is transported to the second storage 26 by a mechanism that circulates a heat medium.

In accordance with the second embodiment, modifications similar to the first modification (FIG. 4) and the second modifications (FIG. 7) of the first embodiment are possible. If a metal hydride is reduced by supplying hydrogen thereto as in the second modification (FIG. 7), it is desirable to adopt a construction in which hydrogen can be supplied to the products of the hydrolysis and the pyrolysis.

In the second embodiment, water generated by the fuel cell 1 is supplied to the reactor 23C. This construction allows a further size reduction of the system than a construction having a water tank. However, it is also practicable to adopt a construction in which instead of water generated by the fuel cell 1, water form a water tank separated provided is supplied to the reactor 23C. In a case where this construction is adopted in the second embodiment, the water tank may have a reduced capacity for the following reason. That is, in the second embodiment, hydrogen is generated in the second storage 26 as well, so that the amount of hydrogen that needs to be generated in the first storage 21 can be reduced and therefore the amount of water that needs to be supplied for the hydrolysis can be reduced. In the second embodiment, an electrification device as in the first modification of the first embodiment may be provided. Furthermore, as in the first embodiment, heat generated by the exothermic reaction in the reactor 23C may be used to generate steam. Still further, as in the first embodiment, heat generated by the exothermic reaction may be removed by a cooling mechanism.

C. A Third Embodiment

Figure 11:
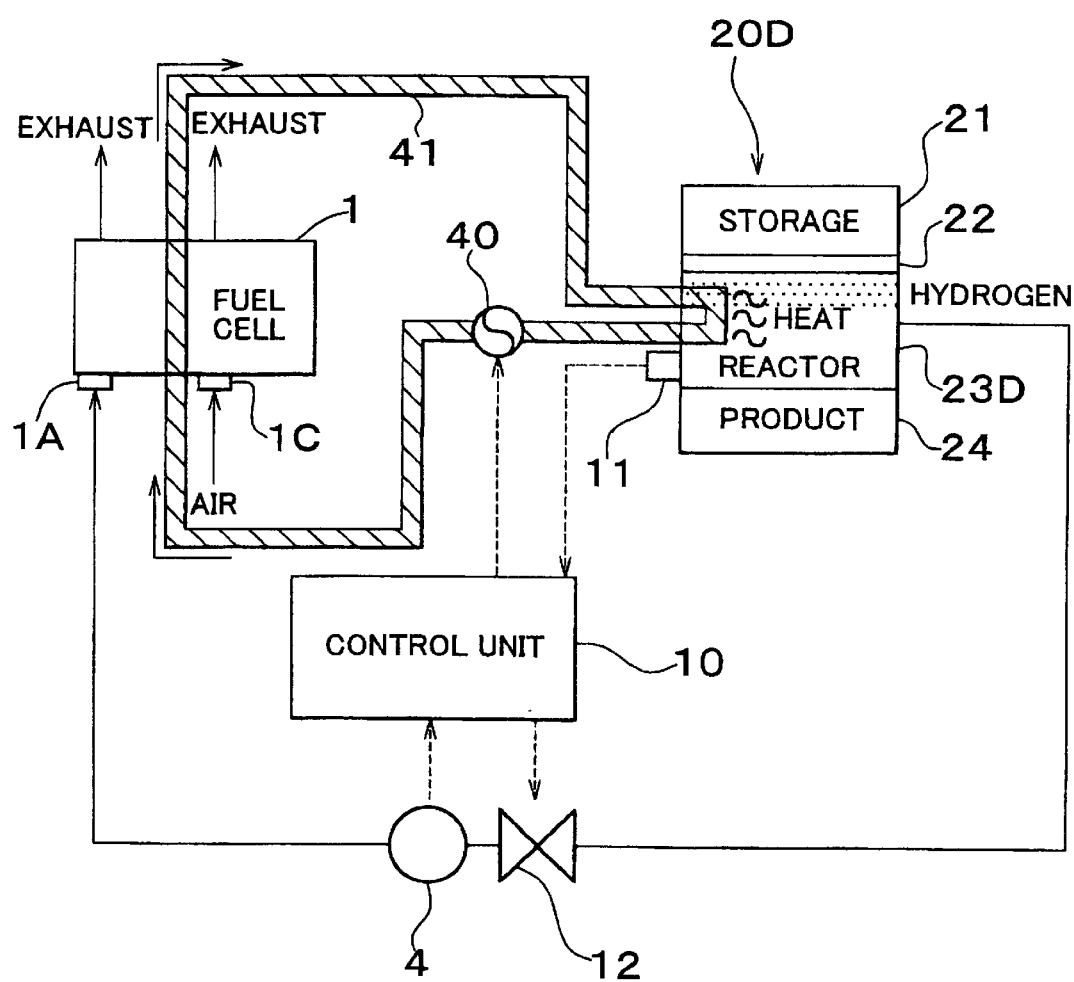
FIG. 11 is a diagram schematically illustrating a construction of a fuel gas generation system as a third embodiment of the invention.

FIG. 11 is a diagram schematically illustrating a construction of a fuel cell system in accordance with a third embodiment of the invention. In the third embodiment, a metal hydride is pyrolyzed by using heat generated by a fuel cell 1. The construction of a fuel gas generation system 20D of the third embodiment differs from the construction of the system of the first embodiment in the following features. Firstly, a circulation mechanism for circulating a heat medium between the fuel cell and a reactor 23D. The circulation mechanism is formed mainly by a piping 41 through which the heat medium flows, and a pump 40 for causing the heat medium to flow. The operation of the pump 40 is controlled by a control unit 10. The heat medium is water in this embodiment. Although the third embodiment employs the mechanism for circulating the heat medium, the heat medium circulating mechanism is not a requirement. That is, any other mechanism suffices as long as the mechanism is able to transport heat from the fuel cell 1 to the reactor 23D.

A first storage 21 stores a metal hydride as is the case with the first embodiment. Any metal hydride that can produce hydrogen may be used. In the third embodiment, NaAlH$_4$ known to thermally decompose at relatively low temperature is used. It is known that NaAlH$_4$ thermally decomposes to produce hydrogen as in the following equation at 100° C. or lower with a suitable catalyst.

$$NaAlH_4 \rightarrow NaH + Al + 3/2 H_2$$

When the control unit 10 operates the pump 40, heat from the fuel cell 1 is transported to the reactor 23D by the heat medium. Then, a metal hydride in the form of fine particles present in the reactor 23D thermally decomposes to produce hydrogen. It is preferable that the reactor 23D contain a catalyst for accelerating the pyrolysis. Generated hydrogen is supplied to the anode 1A. A product 24 formed by the pyrolysis is accumulated in a bottom portion of the reactor 23D. The reactor 23D may also be provided with a heating mechanism such as a heater or the like. By using the heat medium as described above, the degree of freedom in disposing the fuel gas generation system 20D and the fuel cell can be increased.

According to the fuel gas generation system of the third embodiment, hydrogen can be generated by using heat generated by the fuel cell 1. Therefore, the heating mechanism for heating the metal hydride can be omitted or can be reduced in size. Since waste heat from the fuel cell 1 is used, the energy consumption for the heating can be reduced, and the energy efficiency of the system as a whole can be improved.

In the third embodiment, NaAlH$_4$ and water are used as a metal hydride and a heat medium, respectively. The metal hydride and the heat medium need to be selected under a condition that the temperature needed for the hydrolysis of the metal hydride is below the operation temperature of the fuel cell 1 and the upper limit temperature that the heat medium can effectively transport. Since the operation temperature of the polymer electrolyte type fuel cell 1 is about 100° C. to 150° C., the metal hydride needs to be a metal hydride that can be pyrolyzed such temperature. Examples of such metal hydride include NaAlH$_4$, LiAlH$_4$, etc. If a fuel cell of a relatively high operation temperature, such as a phosphoric acid type fuel cell or the like, is used, more kinds of metal hydrides, including NaBH$_4$ and the like, may be used. In this case, it is necessary to select a heat medium whose boiling point is higher than the temperature of the pyrolysis.

In the third embodiment, too, various modifications, such as the fist modification (FIG. 4) and the third modification (FIG. 7) of the first embodiment, may be possible. The third embodiment may also be combined with the second embodiment. That is, the circulating mechanism in the third embodiment may be used as an additional mechanism for heating the second storage 26 in the second embodiment. It is also practicable to adopt a construction in which the fuel cell 1 and the reactor 23D, that is, an example of the reaction portion of the invention, are disposed close to each other, and heat is conducted without using a heat medium.

D. A Fourth Embodiment

Figure 12:
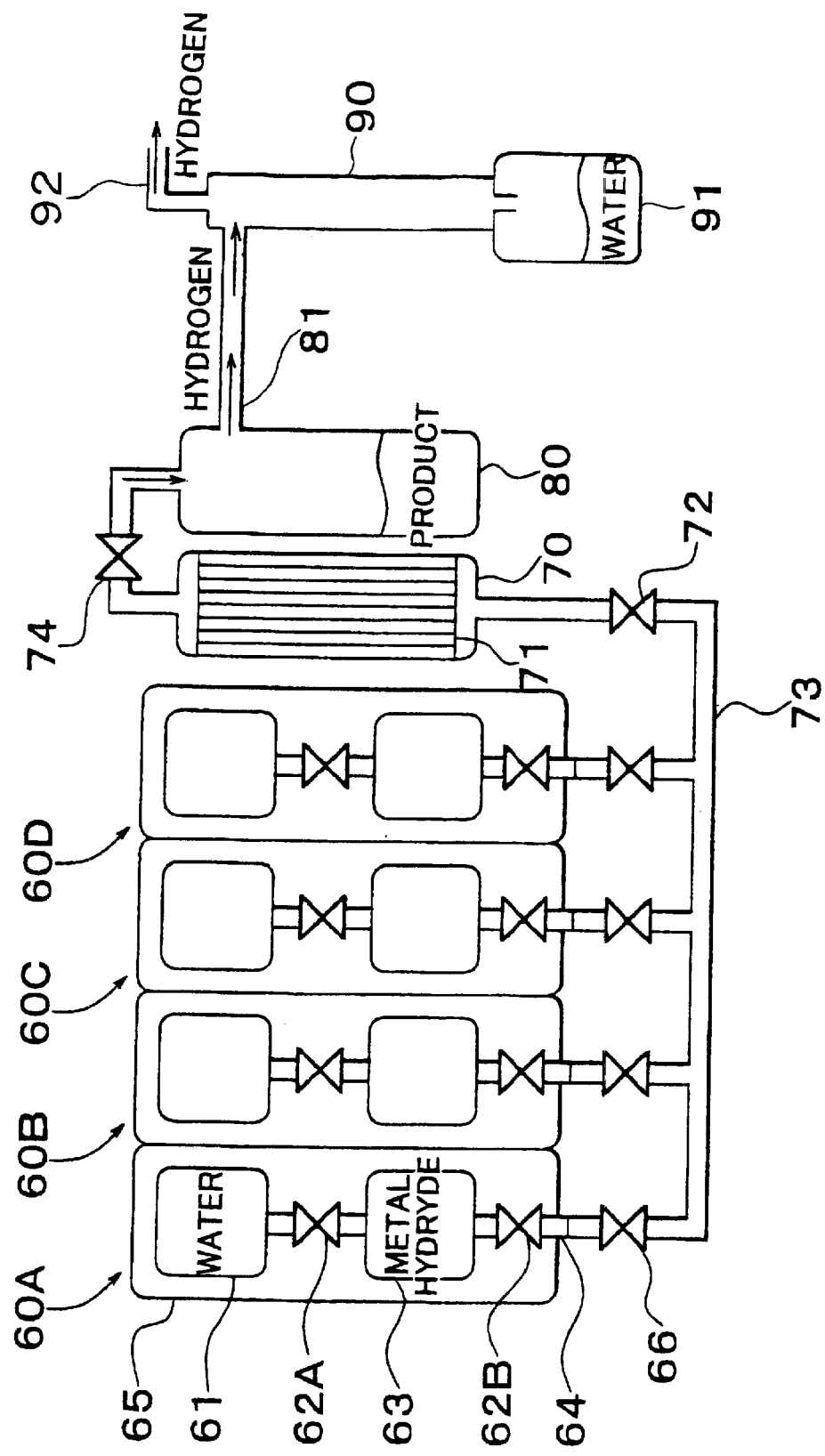
FIG. 12 is a diagram schematically illustrating a construction of a fuel gas generation system as a fourth embodiment of the invention.

FIG. 12 is a diagram schematically illustrating a construction of a fuel gas generation system in accordance with a fourth embodiment of the invention. In the fourth embodiment, a reactor provided with a catalyst is supplied with water and a metal hydride in a mixed state.

As indicated in FIG. 12, water and a metal hydride used for a hydrolysis are supplied from material cassettes 60A to 60D. The number of material cassettes may be suitably selected in accordance with the capacities of tanks in the cassettes, and the amount of hydrogen that needs to be generated.

With regard to the material cassette 60A, an internal construction will be descried. The material cassette 60A has, in a housing case 65 thereof, a water tank 61 that stores water for the hydrolysis, and a metal hydride tank 63 that stores a metal hydride. These tanks are connected by a piping. The piping is designed so that water in the water tank 61 flows into the metal hydride tank 63 and a mixed liquid of water and the metal hydride flows out via a connecting opening 64. The piping is provided with valves 62A, 62B for adjusting the outflow of the liquid from the tanks, respectively.

The fuel gas generation system has a supply pipe 73 for supplying the mixed liquid to a reactor 70. The material cassette 60A is connected at the connecting opening 64 to the supply pipe 73. The supply pipe 73 is provided with a valve 66 for preventing outflow of the mixed liquid when the material cassette 60A is removed. Each of the other material cassettes 60B to 60D is provided with substantially the same construction.

The mixed liquid is supplied to the reactor 70 via a valve 72. The reactor 70 is provided with a reaction unit 71. The reaction unit 71 supports a catalyst for the hydrolysis.

Figure 13:
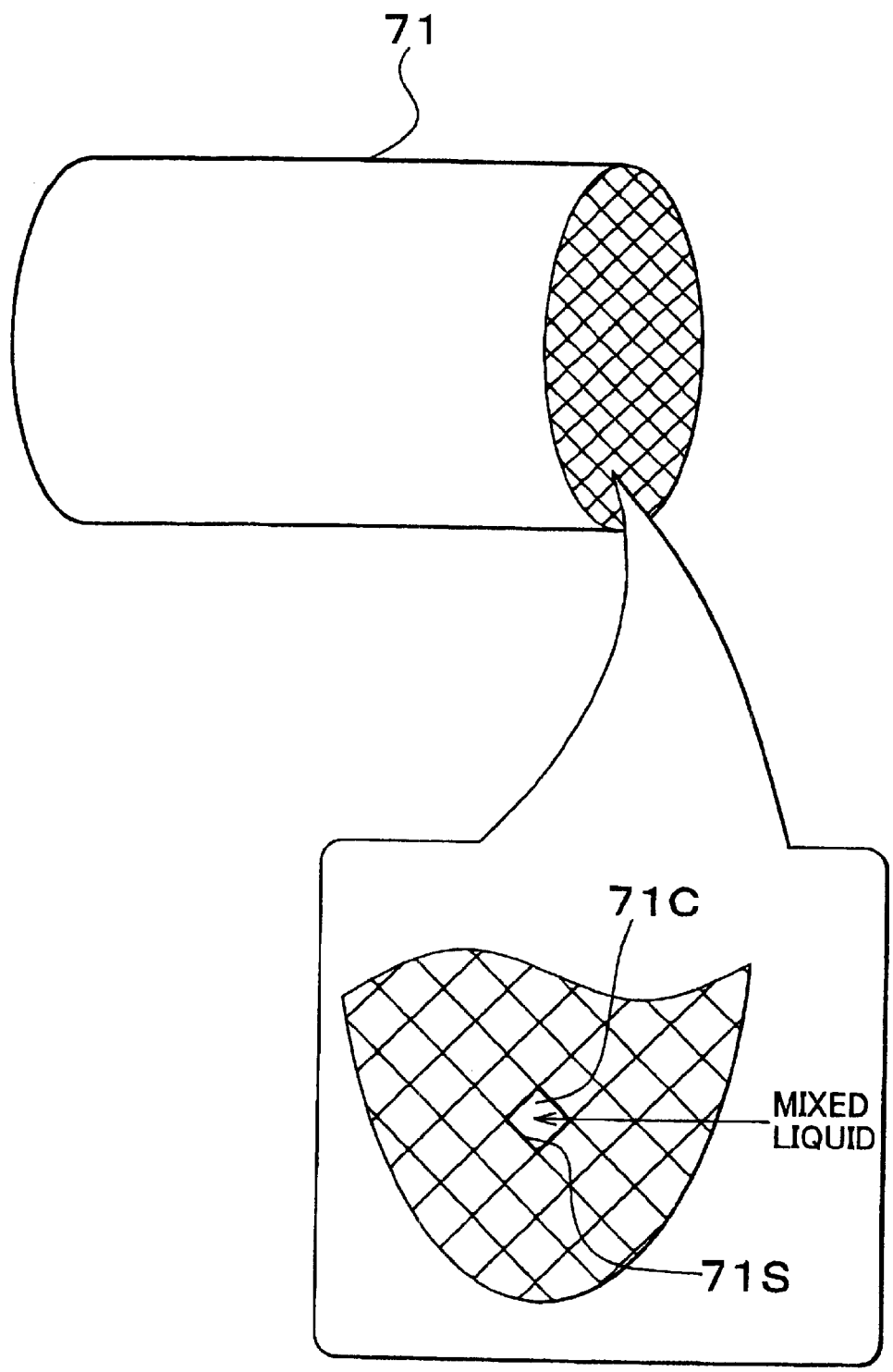
FIG. 13 is a diagram illustrating a construction of a reaction unit 71.

FIG. 13 is a diagram illustrating a construction of the reaction unit 71. The reaction unit 71 is formed by a honeycomb monolith. An enlarged sectional view of the reaction unit 71 is presented in a lower portion of FIG. 13. The honeycomb monolith is a structural body having a plurality of cells 71C. The cells 71C serves as channels for the mixed liquid. The reaction unit 71 is provided with catalytic layers 71S formed on cell surface portions. The catalytic layers 71S can be supported by a physical vapor deposition (PVD), a chemical vapor deposition (CVD), etc. Since the internal pressure of the reaction unit 71 becomes very high due to the hydrolysis, the honeycomb monolith preferably has a strength that withstands such a high internal pressure.

When the mixed liquid is supplied to the reactor 70 and passes through the cells 71C of the reaction unit 71, the mixed liquid rapidly undergoes the hydrolysis to produce hydrogen due to the effect of the supported catalyst. The reactor 70 discharges a mixture of hydrogen, a metal-containing product, and water.

The mixture is supplied to a separator 80 via a valve 74. Gas is temporarily stored in the separator 80, so that impurities made up mainly of the metal-containing product fall and deposit on a bottom portion. Since hydrogen gas is a light-weight gas, the gas flows from a discharge opening 81 formed in an upper portion of the separator 80 into a cooler 90. The cooler 90 is provided with radiator fins for natural air cooling. Due to cooling, steam or water vapor in the gas condenses, and is recovered into a water recovery device 91. A hydrogen gas obtained after the separation of water is discharged via a discharge opening 92, and is supplied to the fuel cell. Water recovered into the water recovery device 91 may be utilized for the hydrolysis, the humidification of the fuel cell.

According to the fourth embodiment, various advantages as follows are achieved by passing the mixed liquid of water and the metal-containing product through the catalyst. Firstly, the use of the mixed liquid advantageously allows the metal hydride to be easily and precisely conveyed, in comparison with a system in which a metal hydride is handled in the form of a solid. Secondly, since the reaction can be accelerated while the mixed liquid is being passed through the reactor 70, the contact between the mixed liquid and the catalyst can easily be secured. Still another advantage is that the wasting of a catalyst can be more effectively prevented in this construction than in a construction in which a catalyst is supplied together with a metal hydride to a reactor.

In the fourth embodiment, the metal hydride and water needed for the hydrolysis are provided in material cassettes. Therefore, there is an advantage of easy addition of the metal hydride. Furthermore, since a plurality of material cassettes are provided in parallel, some cassettes may be replaced while at least one other cassette is being used for hydrogen generation. Thus, the fourth embodiment is effective in mobile bodies wherein the demand for a reduced time of fuel replacement is high, for example, vehicles in particular. Of course, the fourth embodiment may be applied to stationary fuel cells.

The method of supplying water and a metal hydride is not limited to the aforementioned cassette method. For example, the mixed liquid may be stored in a single tank. In this case, it is preferable that environmental conditions, such as temperature, pH, etc., be kept in such states of low reaction speed in order to prevent progress of the hydrolysis in the tank.

Water for the hydrolysis may be water generated by the fuel cell. In this case, it is practical to adopt a construction in which water generated by the fuel cell is supplied to a metal hydride tank and a mixed liquid of water and the metal hydride is supplied to the reactor 70, or a construction in which water and a metal hydride are separately supplied to the supply pipe 73 and a mixed liquid is formed in the supply process. It is also possible to adopt a construction in which water in the material cassette and water generated by the fuel cell are used in combination. Furthermore, the apparatus for supplying hydrogen of the fourth embodiment may also be applied to systems or the like other than fuel cells.

While various embodiments of the invention have been described, it is to be understood that the invention is not limited to the disclosed embodiments or constructions. On the contrary, the invention is intended to cover various modifications and equivalent arrangements without departing from the sprit of the invention. For example, a system may be formed by combining the constructions of the first to fourth embodiments. As one example, a mechanism for injecting water into a reactor (first embodiment) and a circulation mechanism for heating (third embodiment) is combined, and the two mechanisms are selectively used in accordance with the state of operation of the fuel cell 1 or the like. The arrangements described in conjunction with the first embodiment, such as the cooling system (FIG. 2), the gas-water separating mechanism (FIG. 3), the steam generating mechanism (FIG. 8), the hydrogen separator (FIG. 9), etc., are applicable in the other embodiments as well. In the second to fourth embodiments, the catalyst provided in the reactor may be a platinum-based catalyst, a titania-based catalyst, or ruthenium-based catalyst as in the first embodiment. A titania-based catalyst and a ruthenium-based catalyst are particularly preferable.

In accordance with the invention, a first construction of a fuel gas generation system for generating a hydrogen-rich fuel gas for a fuel cell includes a reaction portion that generates hydrogen by at least one reaction mode of a hydrolysis and a pyrolysis of a metal hydride, and a supply mechanism that supplies the reaction portion with at least one of a water and a heat that are generated by the fuel cell, in accordance with the reaction mode in the reaction portion.

As for the metal hydride, it is possible to use various substances that hydrolyze or pyrolyze to generate hydrogen, including the aforementioned substances, such as $NaBH_4$ and $NaAlH_4$. This construction makes it possible to use water or heat generated by the fuel cell for the decomposing reaction. In a system in which a hydrolysis is conducted in the reaction portion, the reaction portion is supplied with water generated by the fuel cell. In a system in which a pyrolysis is conducted in the reaction portion, the reaction portion is supplied with heat. By using water or heat generated by the fuel cell in this manner, it becomes possible to omit a water tank for the hydrolysis or an energy source for the pyrolysis or to sufficiently reduce the size thereof. Thus, the entire system can be reduced in size.

In a further specific embodiment where the reaction conducted in the reaction section is a hydrolysis, a supplying mechanism may have a gas-water separating mechanism for separating a water fraction from the cathode-off gas from the fuel cell, and a water supplying mechanism for supplying water separated by the separating mechanism to the reaction section. Since the cathode-off gas in a fuel cell contains water produced by the fuel cell in the form of steam, water can be separated from the gas by the gas-water separating mechanism, and can be supplied to the reaction section. If the cathode-off gas is directly supplied, there is a possibility that oxygen remaining in the cathode-off gas may oxide the metal hydride into water and a metal-containing product. Therefore, by separating only water from the cathode-off gas, generation of hydrogen via a hydrolysis can be effectively and stably carried out.

The gas-water separating mechanism may be, for example, a condenser, a molecular sieve formed by a porous body, etc. It is also possible to employ a mechanism in which a water tank for storing a predetermined amount of water is provided and the cathode-off gas is supplied into water in the tank. In this mechanism, oxygen and other gases form bubbles, and can easily be separated. Preferably, this mechanism is provided with water level maintaining means for adding water into the water tank so as to maintain a water level that is higher than an opening portion of the cathode-off gas supplying mechanism. The water level maintaining means, for example, may have a construction in which the water level in the water tank is detected by a water level sensor, and water is added if there is a possibility of the water level falling below the opening portion.

In another embodiment wherein the reaction conducted in the reaction section is a pyrolysis, the supplying mechanism may be a heat medium circulating mechanism that circulates a predetermined heat medium between the reaction section and the fuel cell in a heat-exchangeable fashion. It is also practicable to adopt a construction in which the fuel cell and the reaction section are disposed close to each other so that heat can be transferred without using a heat medium. The construction employing a heat medium has an advantage of an increased degree of freedom in the layout of the reaction portion and the fuel cell. The heat medium may be, for example, a cooling water for cooling the fuel cell. It may be advisable to select a heat medium and a catalyst for the pyrolysis in accordance with the temperature of the hydrolysis of the metal hydride. For example, if the cooling water is used as a heat medium, the upper limit heating temperature is 100 degrees centigrade, so that it is advisable to select a metal hydride and a catalyst that enable a pyrolysis within such a temperature range.

In a first construction, electrification means for electrifying a metal hydride may be provided. Due to the internal resistance of the metal hydride during electrification, the metal hydride becomes heated. Therefore, the electrification means can improve the energy efficiency in the pyrolysis than the heating means such as a heater or the like. Furthermore, the quantity of heat generated and the quantity of hydrogen generated can easily be controlled by controlling the voltage applied to the metal hydride. The electrification means may be used for the a pyrolysis during an initial period of the operation when the warm-up of the fuel cell is not sufficient, or may also be used as heating means for compensating for fluctuations in heat and water supplied from the fuel cell.

If a hydrolysis is conducted in the reaction section in the first construction, it is preferable that steam be generated by using heat generated by the hydrolysis. Therefore, heat from the reaction section can be effectively used while the reaction section is cooled. Thus, energy efficiency can be improved. Steam thus generated can be used, for example, to humidify the fuel cell. It is also possible to supply the steam to the reaction section so as to improve the reaction rate due to its diffusibility.

It is also advisable to provide the reaction section with a cooling mechanism for avoiding overheating, regardless of whether heat generated by the hydrolysis can be effectively utilized. The cooling mechanism may be, for example, a construction that cools the reaction section by using a coolant after the coolant has cooled the fuel cell, that is, a construction in which a cooling mechanism for the fuel cell and a cooling mechanism for the reaction section are united into one mechanism. Due to this unification, a size reduction of the cooling mechanism can be achieved. In a low-temperature fuel cell such as a polymer electrolyte type fuel cell, the operation temperature is at most about 100° C., whereas the temperature of the reaction section during the hydrolysis rises to the range of 200° C. to 800° C. in some cases. Therefore, the coolant, even after cooling the fuel cell, can be sufficient to cool the reaction section.

It is desirable that the reaction section in the first construction be loaded with a catalyst. Due to the effect of the catalyst, the rate of reaction and the speed of reaction can be improved. The catalyst may be a platinum-based catalyst, a titania-based, or a ruthenium-based catalyst. Among these, the latter two catalysts are desirable.

The catalyst can be supported by various methods. For example, if a hydrolysis is conducted, it is possible to adopt a method in which the catalyst is supported on a honeycomb monolith. If this method is employed, cavities of the honeycomb monolith can be used as channels of a mixed liquid of water and a metal hydride.

A second construction of the invention includes an exothermic reaction portion that generates hydrogen by an exothermic reaction in which a first metal hydride is hydrolyzed, an endothermic reaction portion that generates hydrogen by pyrolyzing a second metal hydride, and a heat supplying mechanism that supplies a heat generated by the exothermic reaction portion to the endothermic reaction portion. The second construction and the first construction have objects to be achieved in common. That is, the second embodiment is also intended to improve the energy efficiency in generation of hydrogen, and to reduce the size of the apparatus.

The first and second metal hydrides may be selected from various substances as in the case of the first embodiment. The two metal hydrides may be one and the same substance. It is preferable that the first metal hydride be a substance that is easily hydrolyzable, and the second metal hydride be a substance that is easily pyrolyzable.

According to the second construction, hydrogen can also be generated by the endothermic reaction portion utilizing heat generated by the exothermic reaction portion, so that the entire system can be reduced in size and can be made more efficient. Since hydrogen is generated by the endothermic reaction portion as well, the amount of hydrogen that needs to be generated by the exothermic reaction portion can be reduced, and the amount of water that needs to be supplied for the hydrolysis can also be reduced. As a result, there is another advantage of allowing a reduced capacity of the water tank.

The heat supply mechanism may be, for example, a single storing container that is common to an endothermic reaction section and an exothermic reaction section. This arrangement allows efficient supply of heat while allowing a size reduction. The heat supply mechanism may also have a construction in which heat is transferred via a heat medium.

The exothermic reaction section may be supplied with water from a water tank. However, if a water supply mechanism for supplying water generated by the fuel cell, the system can be further reduced in size.

In the second construction, electrification means for electrifying a metal hydride may be provided as in the first construction. Also, similar to the first construction, it is possible to generate steam by utilizing heat generated by the exothermic reaction section, or to provide the exothermic reaction section with a cooling mechanism that is also used for the fuel cell. In the second construction, too, it is preferable that the reaction section be provided with a catalyst.

A third construction of the invention includes a metal ion removing mechanism that removes at least a metal ion from a gas generated by hydrolyzing or pyrolyzing a metal hydride in a reaction portion. As for the reaction, it is possible to apply any one of the reaction portion in the first construction, the reaction portion in the second construction, and the reaction portion in the conventional art.

In the decomposing reaction of the metal hydride, a metal-containing product is generated concurrently with hydrogen. The metal-containing product dissolves into water to form metal ions although the amount is small. Metal ions are known to adversely affect fuel cells. A fourth construction of the invention includes a passage through which a mixed liquid of water and a metal hydride passes, and a catalyst that is supported in the passage and that accelerates the hydrolysis of the metal hydride. As for the reactor, it is possible to apply any one of the reactors in the first and second constructions and the reactor in the conventional art.

Metal oxides are known to adversely affect fuel cells and, in particular, polymer electrolyte fuel cells. This is a phenomenon generally termed ion poisoning. In a polymer electrolyte type fuel cell, sulfonate groups of the electrolyte membrane bind to metal ions, and the membrane becomes unable to perform the proton conducting function. In a third construction, metal ions are removed from the gas generated by the reaction section, the ion poisoning can be avoided.

The removal of metal ions may be performed by, for example, using a permeable membrane that selectively allows permeation of only metal ions. Metal ions may also be removed by chemical precipitation. Furthermore, it is practicable to employ a method in which only hydrogen is separated via a hydrogen separating membrane that selectively allows hydrogen to pass through. The hydrogen separating membrane may be, for example, a thin membrane of palladium or a palladium alloy, a thin membrane formed by supporting such a metal in cavities of a base body of a porous ceramic, etc.

The hydrogen separating membrane is a membrane that allows permeation of only hydrogen due to the differential hydrogen partial pressure across the membrane. The permeation speed increases with decreases in the hydrogen partial pressure on the side of extraction of hydrogen. Therefore, in order to increase the hydrogen permeation speed, a gas other than hydrogen, for example, water vapor, may be supplied as a purge gas to the extraction side, and hydrogen extracted may be forcibly transported toward the fuel cell. Such a purge gas may be, for example, water vapor generated by utilizing heat from the reaction section.

In the first and second embodiments, it is desirable to further provide a storage section for storing a product other than hydrogen generated by the decomposition reaction of the metal hydride, and a reducing mechanism for reducing the product to a metal hydride by supplying hydrogen to the storage section. This allows the metal hydride to be efficiently reused. Hydrogen to be used for the reduction may be supplied from outside, or may be surplus hydrogen that is left unused in the fuel cell. Energy for the reduction is supplied from outside the fuel gas generation system. For example, if a fuel gas generation system is installed in a mobile body, various energy sources installed in the mobile body may be used. As an example, in the case of a mobile body that moves by using power from an electric power generator, regenerative energy obtained at the time of braking may be used as energy for the reduction.

The fuel gas generation system of the invention allows a size reduction and an efficiency improvement, and therefore is highly effective particularly if installed in a mobile body.

Regardless of whether any one of the first to fourth constructions is adopted, it is necessary to appropriately add a metal hydride as a material in a fuel gas generation system for generating hydrogen by hydrolyzing the metal hydride. This addition of the metal hydride can easily be accomplished by using a material cassette as described below. A material cassette in accordance with the invention includes a connecting opening portion, a first storage portion, a second storage portion, a piping structure, and a housing case that houses therein at least the first storage portion, the second storage portion, and the piping structure. The connecting opening portion is a mechanism connected to a piping that communicates with a reactor of a fuel gas generation system. The first storage portion stores a metal hydride. The second storage portion stores water to be used in the hydrolysis.

If water generated by the fuel cell is used for the hydrolysis, the amount of water stored in the second storage portion may be reduced taking into account the water generated by the fuel cell. The piping arrangement is constructed so that the metal hydride and water are mixed and a mixture thereof is caused to flow out via a connecting opening. For example, it is possible to adopt a construction in which the metal hydride and water are extracted from the first and second storage portions, respectively, and are joined before being caused to flow to the connecting opening. It is also practicable to adopt a construction in which water is caused to flow from the second storage portion to the first storage portion and a mixed liquid is caused to flow from the first storage portion. In a fuel gas generation system of a construction in which a plurality of material cassettes can be provided as mentioned above, the generation of hydrogen using at least one material cassette and replacement of at least one other material cassette can be concurrently performed.

The invention may also be constructed in various forms other than a fuel gas generation system, for example, in the form of a fuel cell system, the form of a mobile equipped with the system, etc. It is also possible to construct the invention in the form of a reactor that is loaded with a catalyst.

Furthermore, in a case where hydrogen is generated by utilizing the pyrolysis of a metal hydride as in the first modification of the first embodiment and the third embodiment, it may be advisable to select a metal hydride and a catalyst for the pyrolysis of the metal hydride in accordance with the temperature of a heat medium for heating the metal hydride, or the like.

The fuel gas generation system of the invention allows a size reduction and an efficiency improvement, and therefore is highly effective particularly if installed in a mobile body, for example, a vehicle.

If hydrogen is generated by a hydrolysis and a pyrolysis, it is practicable to supply a reaction section with water generated by a fuel cell or heat generated by the fuel cell, or to supply the reaction section with water generated by the fuel cell and heat generated by the fuel cell.

The "hydrogen-rich" in this invention means that in a fuel gas generated by a decomposition reaction of a metal hydride, hydrogen exists in the highest proportion among the gas components of the fuel gas.

What is claimed is:

1. A fuel gas generation system for generating a hydrogen-rich fuel gas for a fuel cell, comprising:
    a reaction portion that generates hydrogen by at least one reaction mode of a hydrolysis and a pyrolysis of a metal hydride; and
    a supply mechanism that supplies the reaction portion with at least one of a water and a heat that are generated by the fuel cell, in accordance with the reaction mode in the reaction portion.

2. A fuel gas generation system according to claim 1,
    wherein the hydrolysis is conducted in reaction portion, and
    wherein the supply mechanism is a unit comprising a gas-water separating mechanism that separates a water fraction from a cathode-off gas from the fuel cell, and a water supplying mechanism that supplies the reaction portion with the water separated by the gas-water separating mechanism.

3. A fuel gas generation system according to claim 2, wherein the gas-water separating mechanism comprises a water storage tank for storing a predetermined amount of water, and a gas supplying mechanism that supplies the cathode-off gas into the water in the water storage tank.

4. A fuel gas generation system according to claim 3, further comprising a water level maintaining device that adds water into the water storage tank so as to maintain a water level above an opening portion of the gas supplying mechanism.

5. A fuel gas generation system according to claim 1,
wherein the pyrolysis is conducted in the reaction portion, and
wherein the supply mechanism is a heat medium circulating mechanism that circulates a predetermined heat medium between the fuel cell and the reaction portion in a heat exchangeable manner.

6. A fuel gas generation system according to claim 1, further comprising an electrification device that electrifies the metal hydride.

7. A fuel gas generation system according to claim 1, wherein the hydrolysis is conducted in the reaction portion, and wherein the fuel gas generation system further comprises a steam generating mechanism that generates a steam by utilizing a heat generated in the reaction portion.

8. A fuel gas generation system according to claim 1, further comprising a cooling mechanism that cools the reaction portion by using a coolant after the coolant has cooled the fuel cell.

9. A fuel gas generation system according to claim 1, further comprising:
an accumulating portion that accumulates a product generated by the at least one of the hydrolysis and the pyrolysis; and
a reducing mechanism that reduces the product to a metal hydride by supplying hydrogen to the accumulating portion.

10. A fuel gas generation system according to claim 1, wherein the metal hydride is at least one of $NaBH_4$ and $NaAlH_4$.

11. A fuel gas generation system according to claim 1, further comprising a mobile body, wherein the fuel gas generation system is installed in the mobile body.

12. A fuel gas generation system according to claim 1, wherein the reaction portion is loaded with a catalyst.

13. A fuel gas generation system according to claim 12,
wherein the reaction portion has a honeycomb monolith that is loaded with a catalyst that accelerates the hydrolysis, and
wherein a cavity of the honeycomb monolith forms a passage of a mixed liquid of water and the metal hydride.

14. A fuel gas generation system according to claim 12, wherein the catalyst is at least one of a titania-based catalyst and a ruthenium-based catalyst.

15. A fuel gas generation system for generating a hydrogen-rich fuel gas for a fuel cell, comprising:
an exothermic reaction portion that generates hydrogen by an exothermic reaction in which a first metal hydride is hydrolyzed;
an endothermic reaction portion that generates hydrogen by pyrolyzing a second metal hydride; and
a heat supplying mechanism that supplies a heat generated by the exothermic reaction portion to the endothermic reaction portion.

16. A fuel gas generation system according to claim 15, wherein the heat supplying mechanism is a single container that is common to the endothermic reaction portion and the exothermic reaction portion.

17. A fuel gas generation system according to claim 15, further comprising a water supplying mechanism that supplies the exothermic reaction portion with a water generated by the fuel cell.

18. A fuel gas generation system according to claim 15, further comprising an electrification device that electrifies the metal hydride.

19. A fuel gas generation system according to claim 15, further comprising:
an accumulating portion that accumulates a product generated by a reaction in one of the exothermic reaction portion and the endothermic reaction portion; and
a reducing mechanism that reduces the product to a metal hydride by supplying water to the accumulating portion.

20. A fuel gas generation system according to claim 15, wherein the first metal hydride and the second metal hydride are at least one of $NaBH_4$ and $NaAlH_4$.

21. A fuel gas generation system according to claim 15, further comprising a mobile body, wherein the fuel gas generation system is installed in the mobile body.

22. A fuel gas generation system for generating a hydrogen-rich fuel gas for a fuel cell, comprising:
a reaction portion that generates hydrogen by at least one of a hydrolysis and a pyrolysis of a metal hydride; and
a metal ion removing mechanism that removes at least a metal ion from a gas generated by the reaction portion.

23. A fuel gas generation system according to claim 22, wherein the metal ion removing mechanism includes a hydrogen separating membrane that selectively allows hydrogen to permeate.

24. A fuel gas generation system according to claim 22, further comprising:
an accumulating portion that accumulates a product generated by the at least one of the hydrolysis and the pyrolysis; and
a reducing mechanism that reduces the product to a metal hydride by supplying hydrogen to the accumulating portion.

25. A fuel gas generation system according to claim 22, wherein the metal hydride is at least one of $NaBH_4$ and $NaAlH_4$.

26. A fuel gas generation system according to claim 22, further comprising a mobile body, wherein the fuel gas generation system is installed in the mobile body.

27. A fuel gas generation method for generating a hydrogen-rich fuel gas for a fuel cell, in which a metal hydride is decomposed by supplying the metal hydride with at least one of a water and a heat that are generated by the fuel cell.

28. A fuel gas generation method for generating a hydrogen-rich fuel gas for a fuel cell, comprising:
hydrolyzing a first metal hydride by an exothermic reaction to generate hydrogen;
supplying a heat generated in the hydrolyzing step to a second metal hydride; and
pyrolyzing the second metal hydride by an endothermic reaction to generate hydrogen.

29. A fuel gas generation method for generating a hydrogen-rich fuel gas for a fuel cell, comprising:

generating hydrogen by at least one of a hydrolysis and a pyrolysis of a metal hydride; and removing at least a metal ion from a gas generated by the at least one of the hydrolysis and the pyrolysis of the metal hydride to efficiently generate hydrogen.

30. A reactor having a passage with a catalyst for use in a hydrolysis of a metal hydride, comprising:

a passage coupled with the reactor through which a mixed liquid of water and a metal hydride passes; and a catalyst that is supported in the passage and that accelerates the hydrolysis of the metal hydride.

31. A reactor according to claim 30, wherein the passage is formed by a cavity of a honeycomb monolith having a plurality of cells.

32. A material cassette for use in a fuel gas generation system, comprising:

a connecting opening portion that is connected to a piping that communicates with a reactor for a hydrolysis of a metal hydride in the fuel gas generation system;

a first storage portion that stores the metal hydride;

a second storage portion that stores water to be supplied to the hydrolysis;

a piping structure that mixes water and the metal hydride to form a mixed liquid and causes the mixed liquid to flow out via the connecting opening portion; and a housing case that houses therein at least the first storage portion, the second storage portion, and the piping structure.

\* \* \* \* \*